(12) United States Patent
Fritsche et al.

(10) Patent No.: US 10,051,961 B2
(45) Date of Patent: Aug. 21, 2018

(54) MODULAR TABLE SYSTEM

(71) Applicant: Skyline Displays, Inc., Eagan, MN (US)

(72) Inventors: Mark Fritsche, Eagan, MN (US); Greg Mathieson, Eagan, MN (US); Evan Detskas, Eagan, MN (US); Randy Mauricio, Eagan, MN (US); Theresa Curran, Eagan, MN (US)

(73) Assignee: Skyline Displays, LLC, Eagan, MN (US)

( * ) Notice: Subject to any disclaimer, the term of this patent is extended or adjusted under 35 U.S.C. 154(b) by 0 days.

(21) Appl. No.: 15/057,094

(22) Filed: Feb. 29, 2016

(65) Prior Publication Data

US 2017/0049226 A1    Feb. 23, 2017

Related U.S. Application Data

(60) Provisional application No. 62/126,428, filed on Feb. 27, 2015.

(51) Int. Cl.

| | |
|---|---|
| A47B 29/00 | (2006.01) |
| A47B 87/00 | (2006.01) |
| A47F 9/00 | (2006.01) |
| A47F 3/00 | (2006.01) |
| A47F 5/10 | (2006.01) |
| A47B 13/08 | (2006.01) |
| A47B 47/00 | (2006.01) |
| F16B 12/26 | (2006.01) |
| F16B 12/38 | (2006.01) |

(52) U.S. Cl.
CPC .......... *A47B 87/002* (2013.01); *A47B 13/088* (2013.01); *A47B 47/0075* (2013.01); *A47B 47/0091* (2013.01); *A47B 87/008* (2013.01); *A47F 3/004* (2013.01); *A47F 5/10* (2013.01); *A47F 9/00* (2013.01); *F16B 12/26* (2013.01); *F16B 12/38* (2013.01); *A47B 2220/0077* (2013.01); *A47B 2220/0091* (2013.01)

(58) Field of Classification Search
CPC .................................. A47B 47/03; A47B 47/04
USPC ........................... 312/263–265, 265.5, 265.6
See application file for complete search history.

(56) References Cited

U.S. PATENT DOCUMENTS

| | | | |
|---|---|---|---|
| 6,082,837 A | 7/2000 | Battochio et al. | |
| 6,189,700 B1 | 2/2001 | Packrall et al. | |
| 6,240,855 B1 | 6/2001 | Pirkl et al. | |
| 6,561,474 B1 | 5/2003 | Walter et al. | |
| 6,724,633 B1 * | 4/2004 | Wu ........................ | G06F 1/181 |
| | | | 206/372 |

(Continued)

FOREIGN PATENT DOCUMENTS

| | | |
|---|---|---|
| EP | 1692981 A1 | 8/2006 |
| EP | 1692981 B1 | 10/2007 |
| WO | 2007065511 A1 | 6/2007 |

*Primary Examiner* — Matthew W Ing
(74) *Attorney, Agent, or Firm* — Thomas J. Oppold; Larkin Hoffman Daly & Lindgren, Ltd.

(57) ABSTRACT

A modular table system having a base assembly, a pedestal and a top member. The base assembly includes a plurality of base members. The pedestal includes a plurality of adjacent wall panels, each supported by a corresponding one of the base members. The member engages with upper panel mounts on at least some of wall panels, whereby the base assembly, the pedestal and the top member define an enclosure.

16 Claims, 38 Drawing Sheets

(56) References Cited

U.S. PATENT DOCUMENTS

| | | |
|---|---|---|
| 7,101,000 B2 | 9/2006 | DeMars |
| D646,508 S | 10/2011 | Parizek et al. |
| D652,655 S | 1/2012 | Parizek et al. |
| D657,974 S | 4/2012 | Parizek et al. |
| 8,469,956 B2 | 6/2013 | McKenna et al. |
| 8,919,507 B2 | 12/2014 | Parizek et al. |
| 2005/0082082 A1 | 4/2005 | Walter et al. |
| 2006/0118460 A1 | 6/2006 | McKenzie et al. |

\* cited by examiner

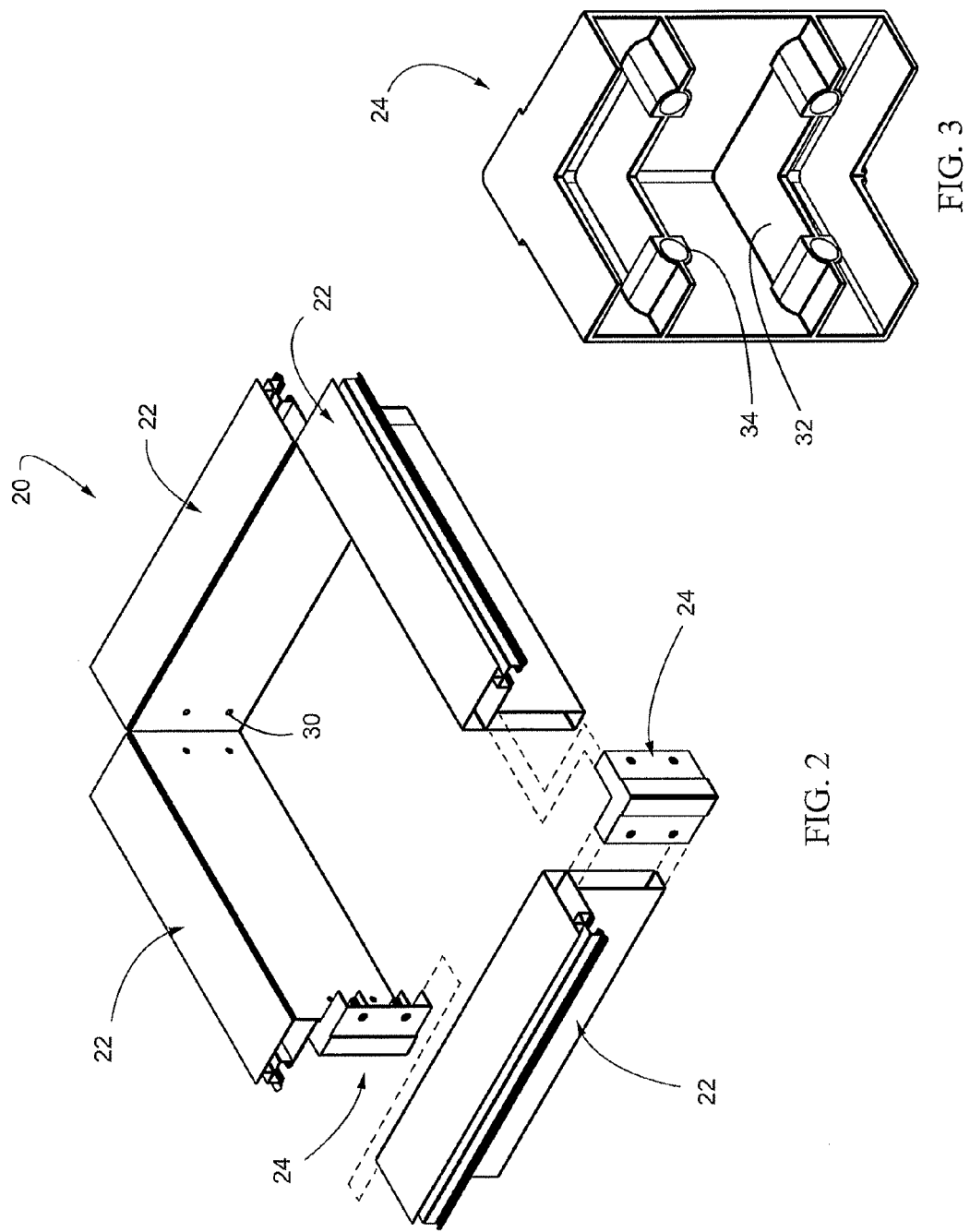

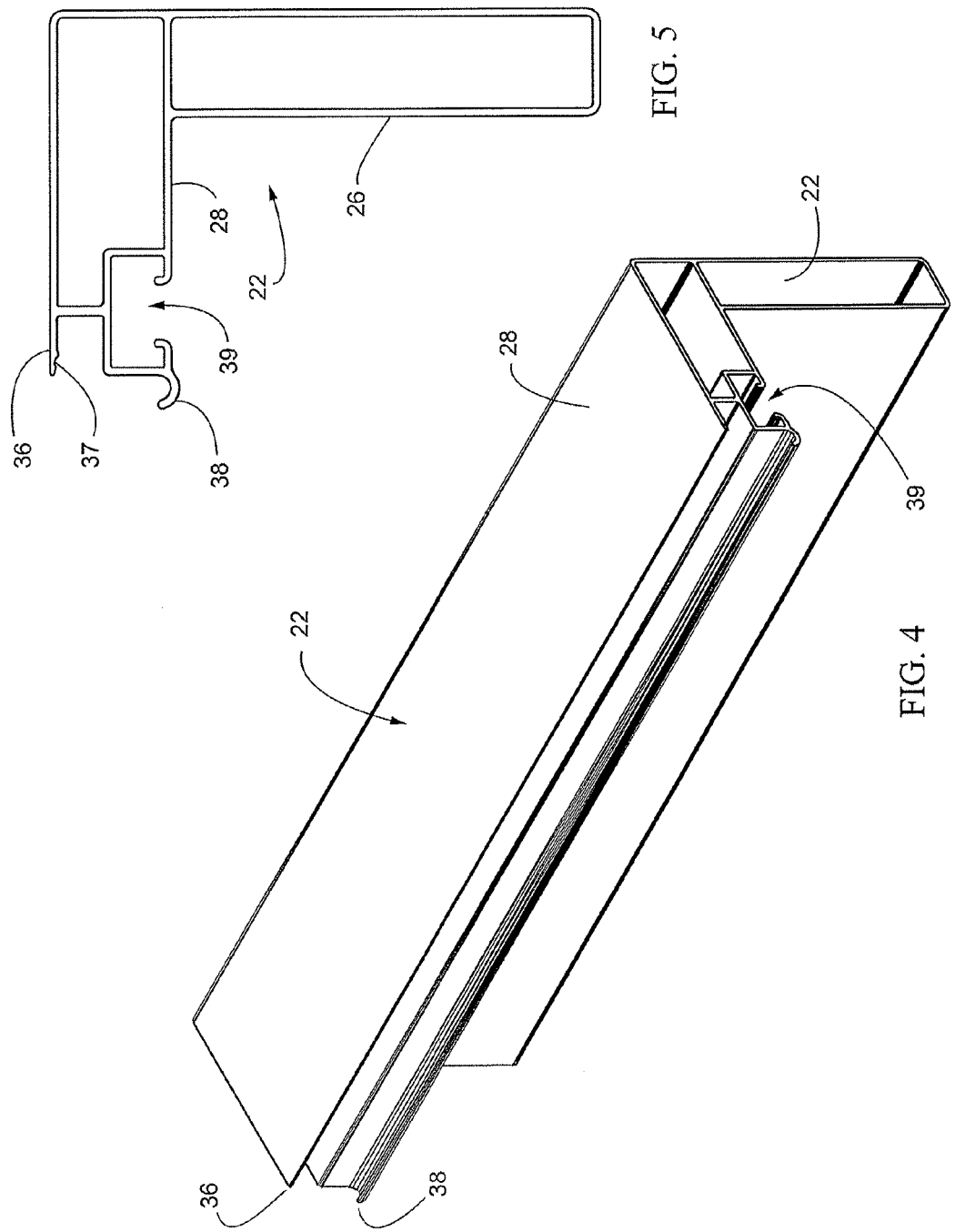

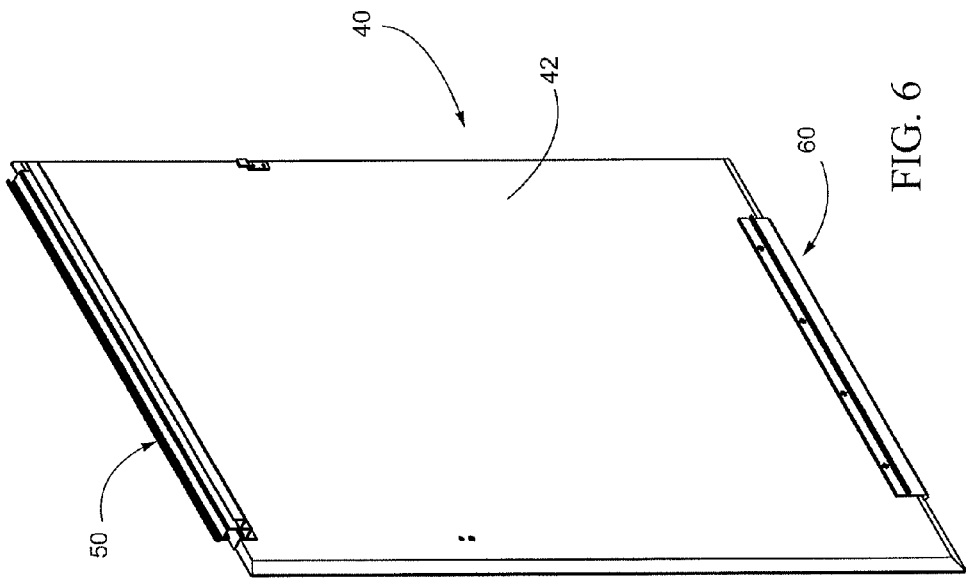

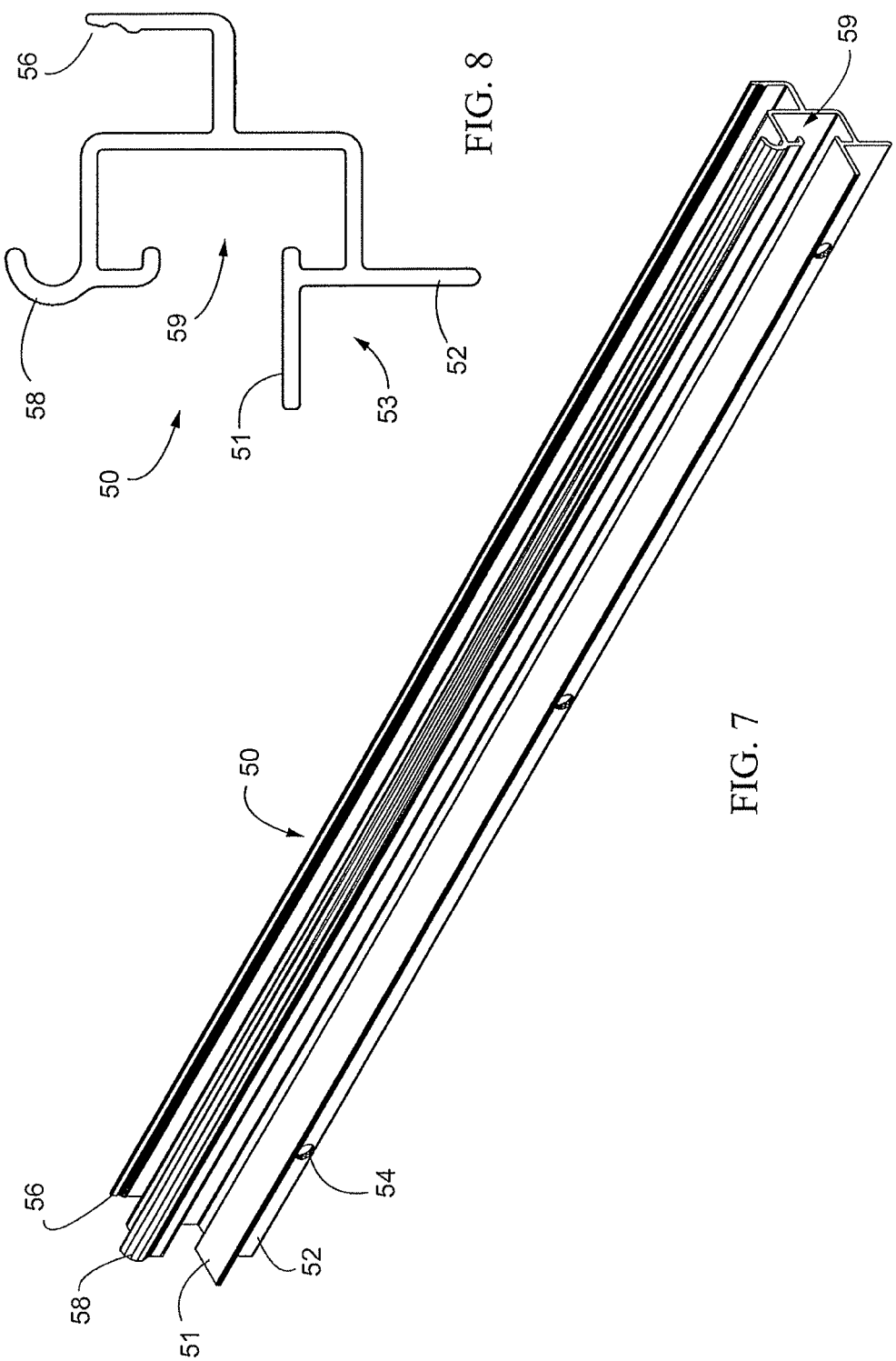

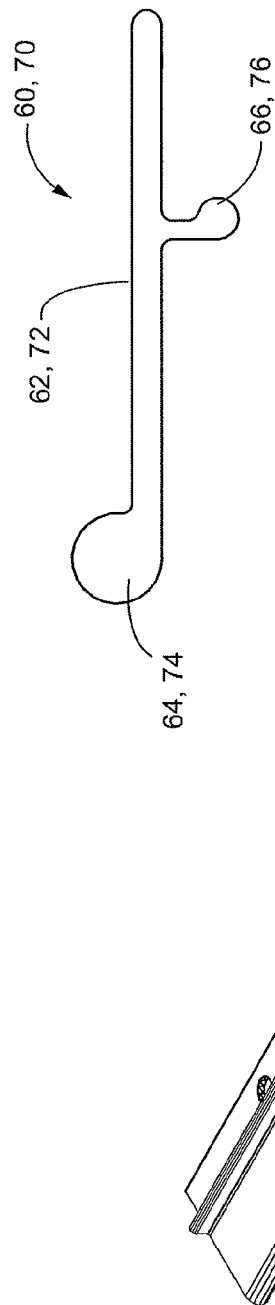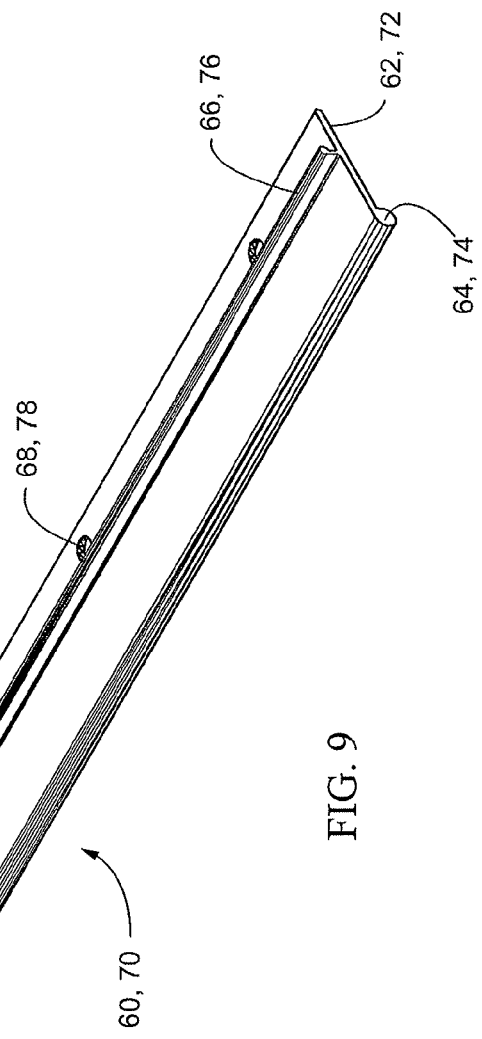
FIG. 10
FIG. 9

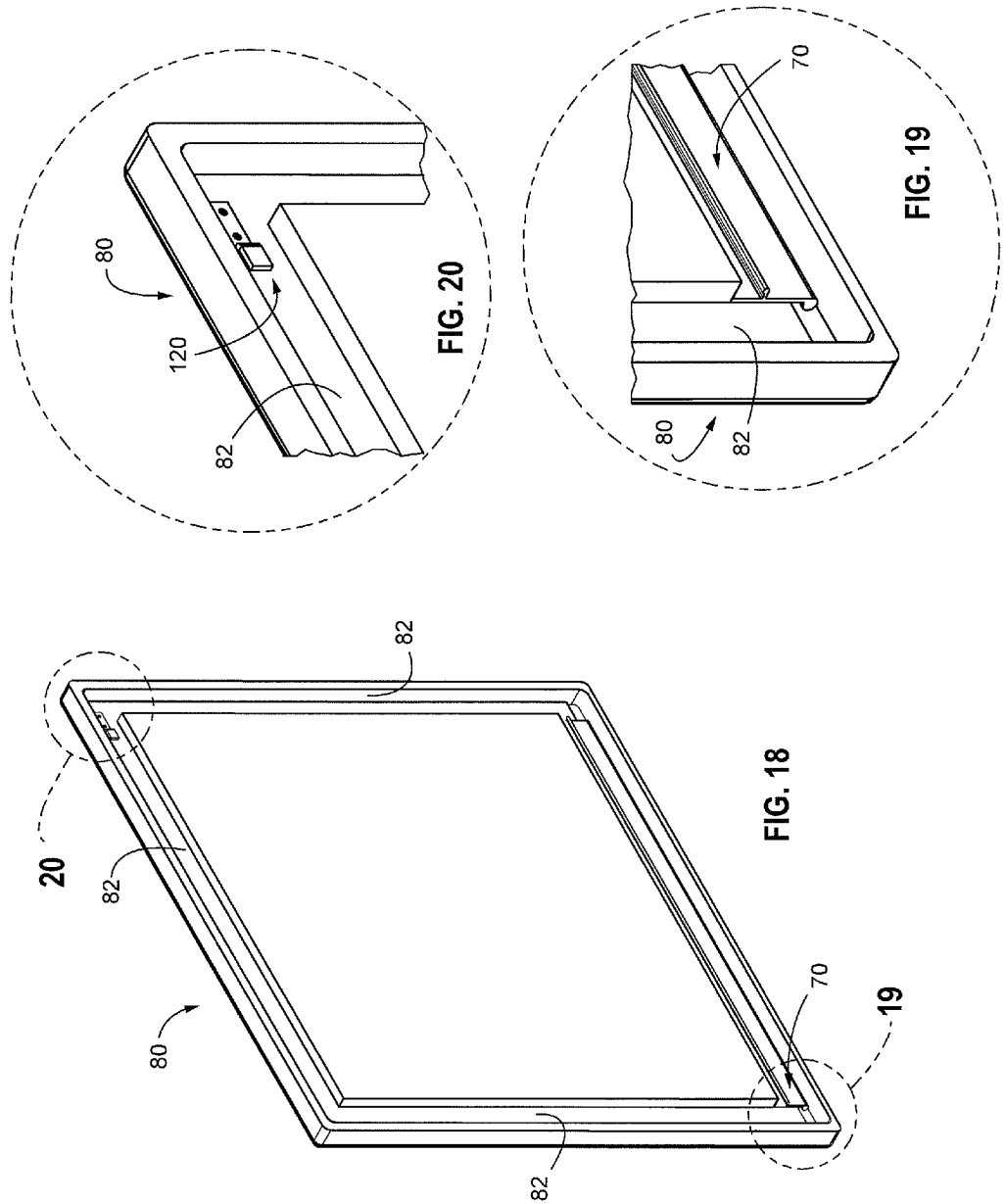

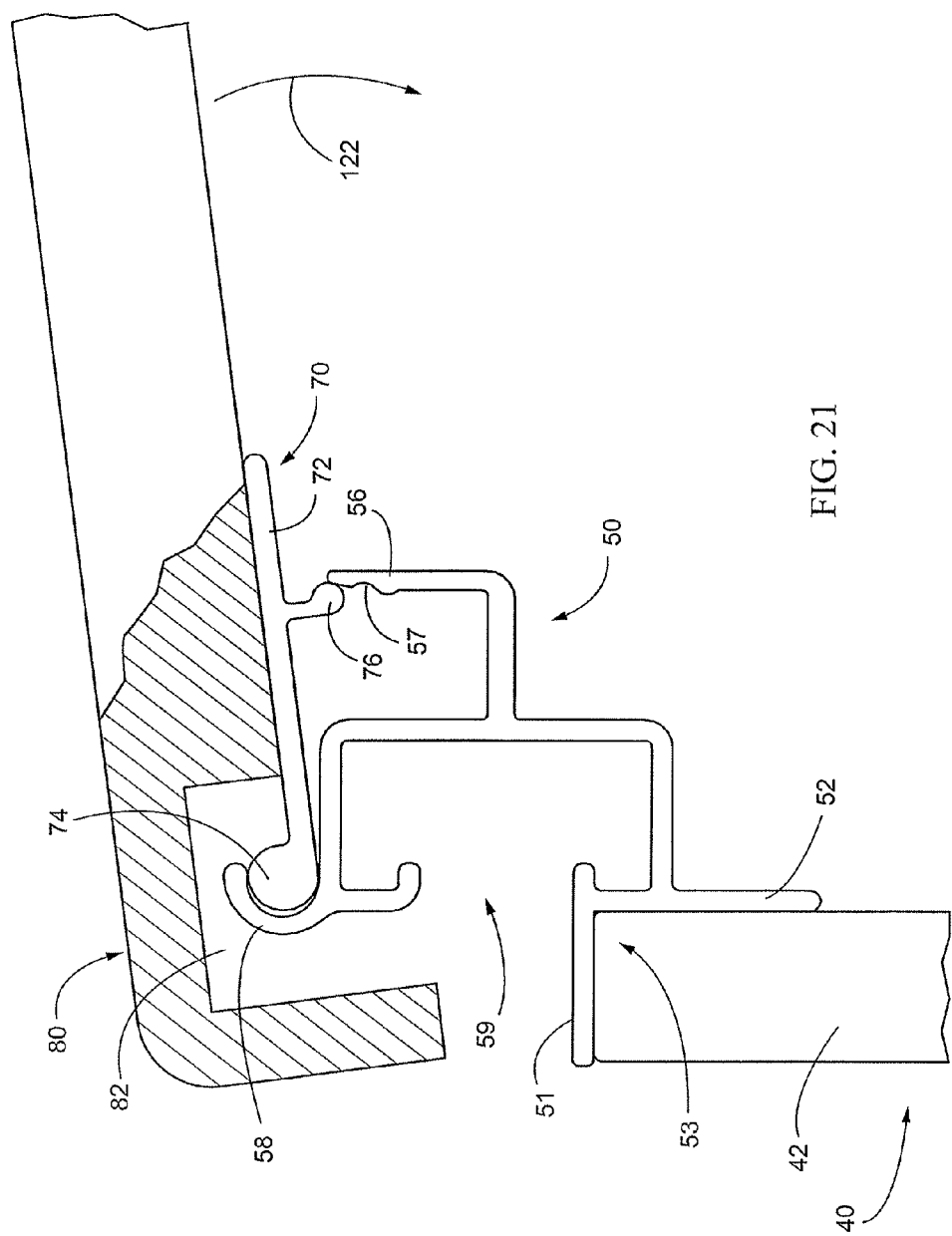

MODULAR TABLE SYSTEM

CROSS-REFERENCE TO RELATED APPLICATIONS

This is a non-provisional application which claims the benefit of U.S. Provisional Application No. 62/126,428, filed Feb. 27, 2015.

BACKGROUND

Tables systems are often used by exhibitors at tradeshows and exhibitions. It is desirable for such table systems to be relatively lightweight, while also being durable, rigid and laterally stable table. Exhibitors also want a table system that provides a finished and aesthetically pleasing furniture appearance, but which is also quickly assembled and disassembled, preferably without tools. Additionally, it is desirable to exhibitors to be able to easily pack their exhibit tables and other exhibit items into small easily transport units. An additional desirable feature is a table system that provides a secure storage area in which the exhibitor can keep personal belongings as well as extra marketing materials and other supplies out of sight of visitors.

Furthermore, because the space available to an exhibitor may vary from event to event, and because different exhibitors may prefer different arrangements, it is generally desirable to have a table system which is modular and configurable to varying lengths and shapes.

DESCRIPTION OF THE DRAWINGS

FIG. 2 is an exploded perspective view of an embodiment of a base assembly of the modular table system of FIG. 1.

FIG. 3 is an enlarged perspective view of an embodiment of a corner connector for the base assembly of FIG. 2.

FIG. 4 is an enlarged perspective view of an embodiment of a base member for the base assembly of FIG. 2.

FIG. 5 is an end elevation view of the base member of FIG. 4.

FIG. 6 is a perspective view of an embodiment of a wall panel of the modular table system of FIG. 1 showing upper and lower panel mounts.

FIG. 7 is an enlarged perspective view of an embodiment of the upper panel mount of FIG. 6.

FIG. 8 is an end elevation view of the upper panel mount of FIG. 7.

FIG. 9 is an enlarged perspective view of an embodiment of the lower panel mount of FIG. 6 and the top member mount of FIG. 18.

FIG. 10 is an end elevation view of the lower panel mount and top member mount of FIG. 9.

FIG. 18 is a perspective view of an inside surface of an embodiment of the top member.

FIG. 19 is an enlarged partial perspective view of a corner of the top member of FIG. 18 showing the top member mount.

FIG. 20 is an enlarged partial perspective view of another corner of the top member of FIG. 18 showing the top lock bracket.

FIG. 21 is an enlarged elevation view with the top member in partial cross-section showing the top member mount being received into the upper panel mount of a wall panel.

DESCRIPTION

Figure 1:
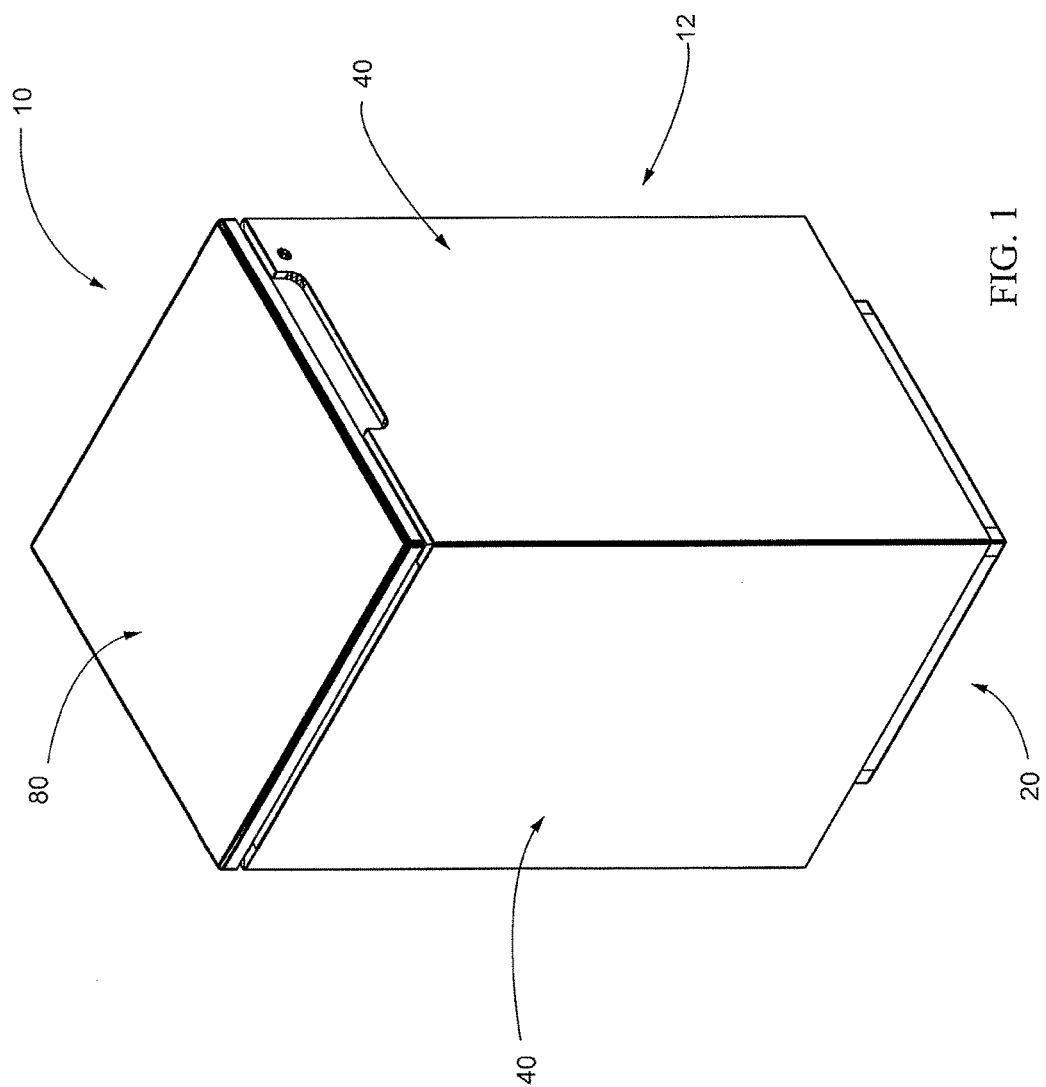
FIG. 1 is a perspective view of one embodiment of a modular table system.

Referring to the drawing figures wherein like reference numerals designate the same or corresponding parts throughout the several views, FIG. 1. is a perspective view of one embodiment of a modular table system 10. The modular table system 10 is comprised of a base assembly 20 which supports wall panels 40 around its periphery defining a pedestal 12. A top member 80 attaches to the top of the pedestal 12 thereby defining an enclosed area within the pedestal 12.

Figure 13:
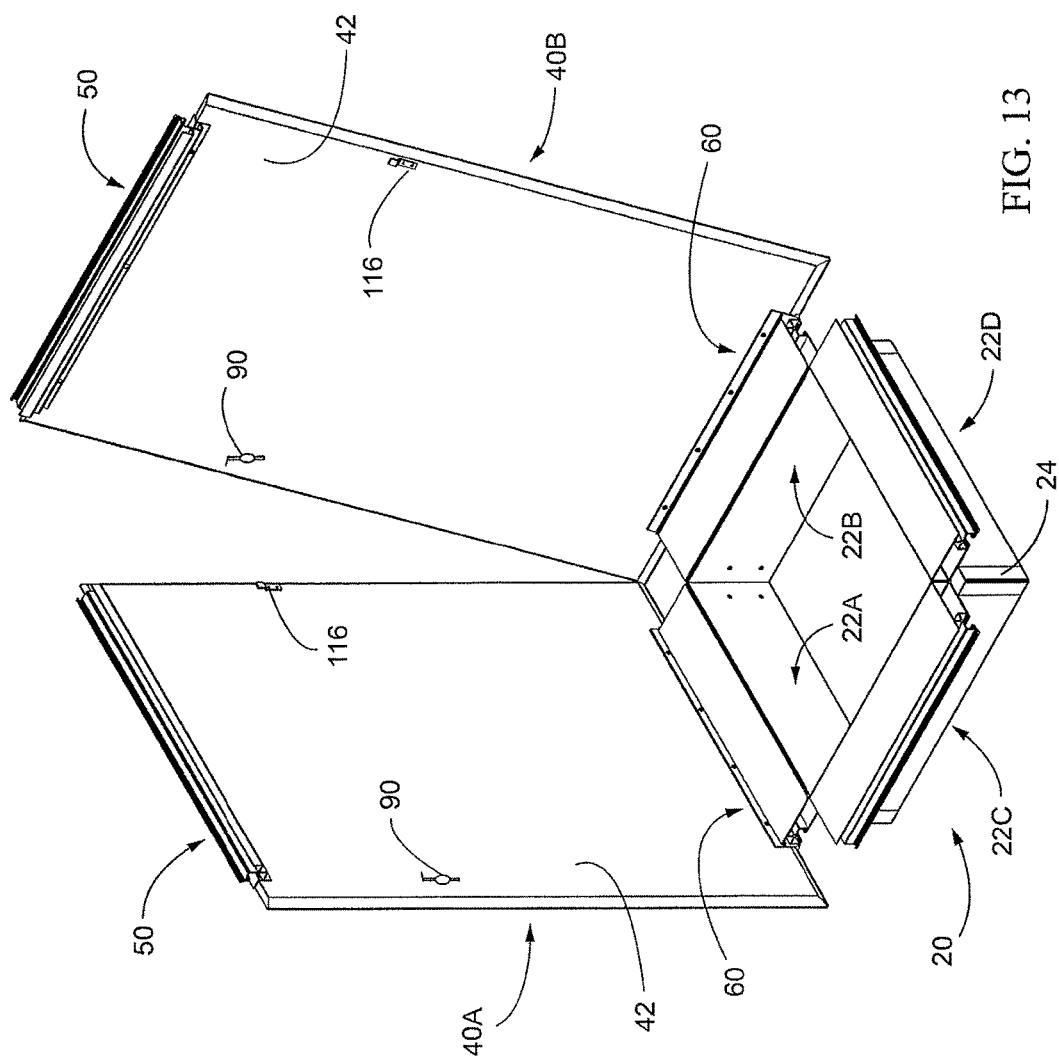
FIG. 13 is a perspective view of the modular table system of FIG. 1 at an initial assembly stage of two wall panels positioned into the base assembly.
Figure 29:
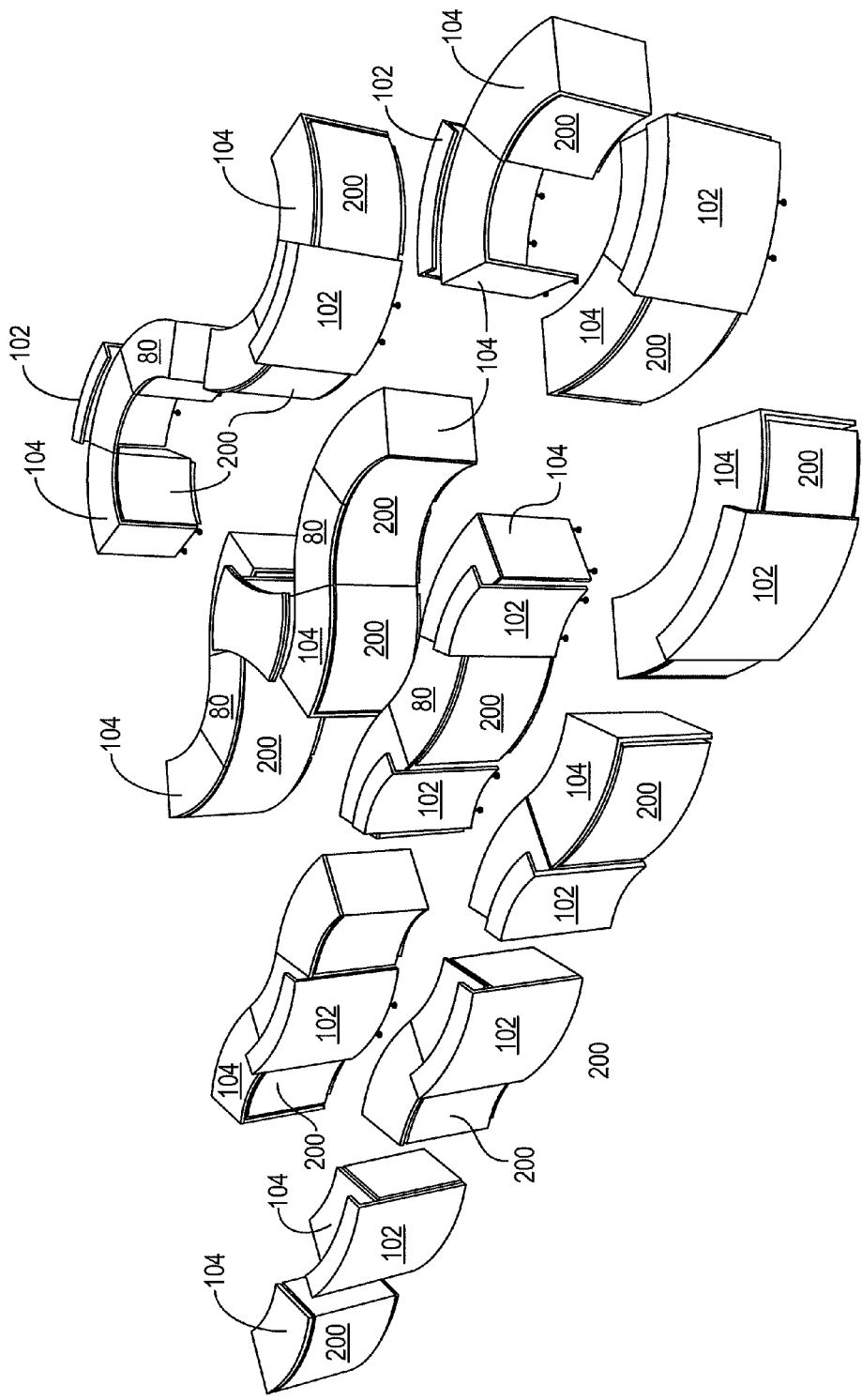
FIG. 29 illustrates various combinations and sizes of curved modular table systems with accessories.
Figure 30:
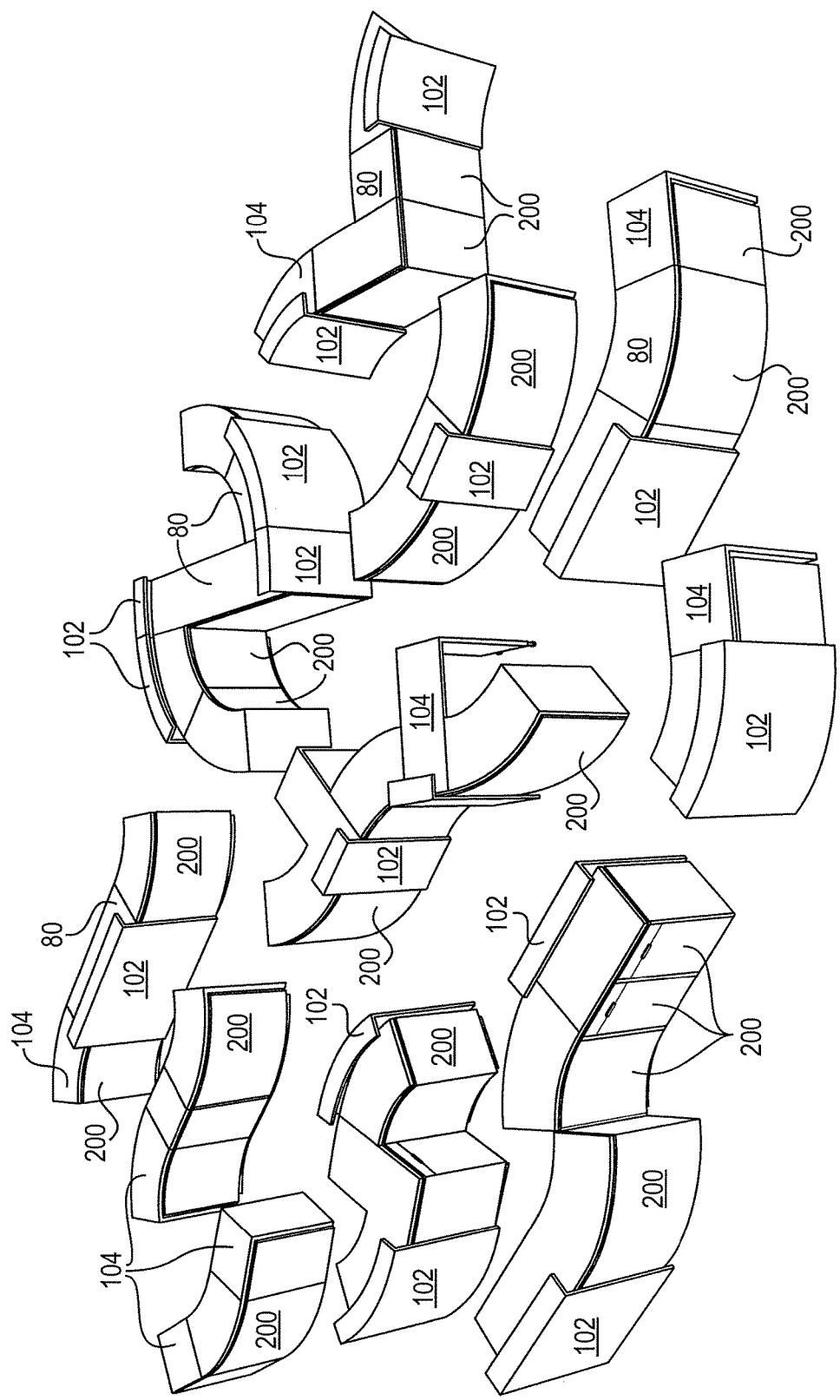
FIG. 30 illustrates various combinations of rectangular and curved modular table systems with accessories.

The base assembly 20 is best illustrated in FIGS. 2 and 13. FIG. 13 shows the fully assembled base assembly 20 and FIG. 2 is a partially exploded perspective view of the base assembly 20. In this embodiment, the base assembly is comprised of four base members 22 joined together by corner connectors 24 forming a square base assembly. It should be appreciated, however that the base assembly 20 may be triangular, rectangular, trapezoidal, hexagonal, octagonal or any other desired shape by varying the lengths and numbers of the base members 22 joined together. The base members 22 may also be curved if a curved modular table system 10 is desired, such as shown in FIG. 29.

An enlarged perspective view of one embodiment of the base members 22 is shown in FIG. 4 with an enlarged end elevation view shown in FIG. 5. In this embodiment, the base member 22 is shown as an extrusion, but may be fabricated from rolled shapes or plate joined together. The base member 22 may be comprised of aluminum, steel, plastic or other suitable material. The base member 22 is comprised of a vertical leg 26 and a horizontal leg 28. Referring to FIG. 2, the base members 22 may be joined by corner connectors 24 received into the ends of the vertical legs 26. Taping screws 30, rivets or other connectors may be used to secure the base members 22 to the corner connectors 24 thereby forming the base assembly 20. Although the corner connectors 24 are shown as 90 degree angles, the corner connectors 24 may form any desired angle depending on the number of sides and shape desired for the pedestal 12 of the modular table system 10. The corner connectors 24 may incorporate webs 32 and sockets 34 for added rigidity and to securely hold the tapping screws 30 or other connectors.

The horizontal leg 28 of the base member 22 includes an outwardly projecting upper flange 36 and an outwardly projecting curved flange 38, which cooperate with the lower panel mounts 60 for securing the wall panels 40 to the base assembly 20 as described later. The horizontal leg 28 also forms a C-shaped track 39, the purpose of which is discussed later.

FIG. 6 is a perspective view of one of the wall panels 40. The wall panel 40 is comprised of a panel member 42 to which is secured an upper panel mount 50 and a lower panel mount 60. The panel member 42 may be made from any suitable material. One type of material found to be particularly suitable, is PVC wrapped MDF (polyvinyl chloride wrapped medium-density fiberboard), due to its relatively low cost and durability in resisting scratches and chipping. The wall panel 40 may have any desired length and height depending on the desired length, height and shape of the modular table system 10.

Figure 11:
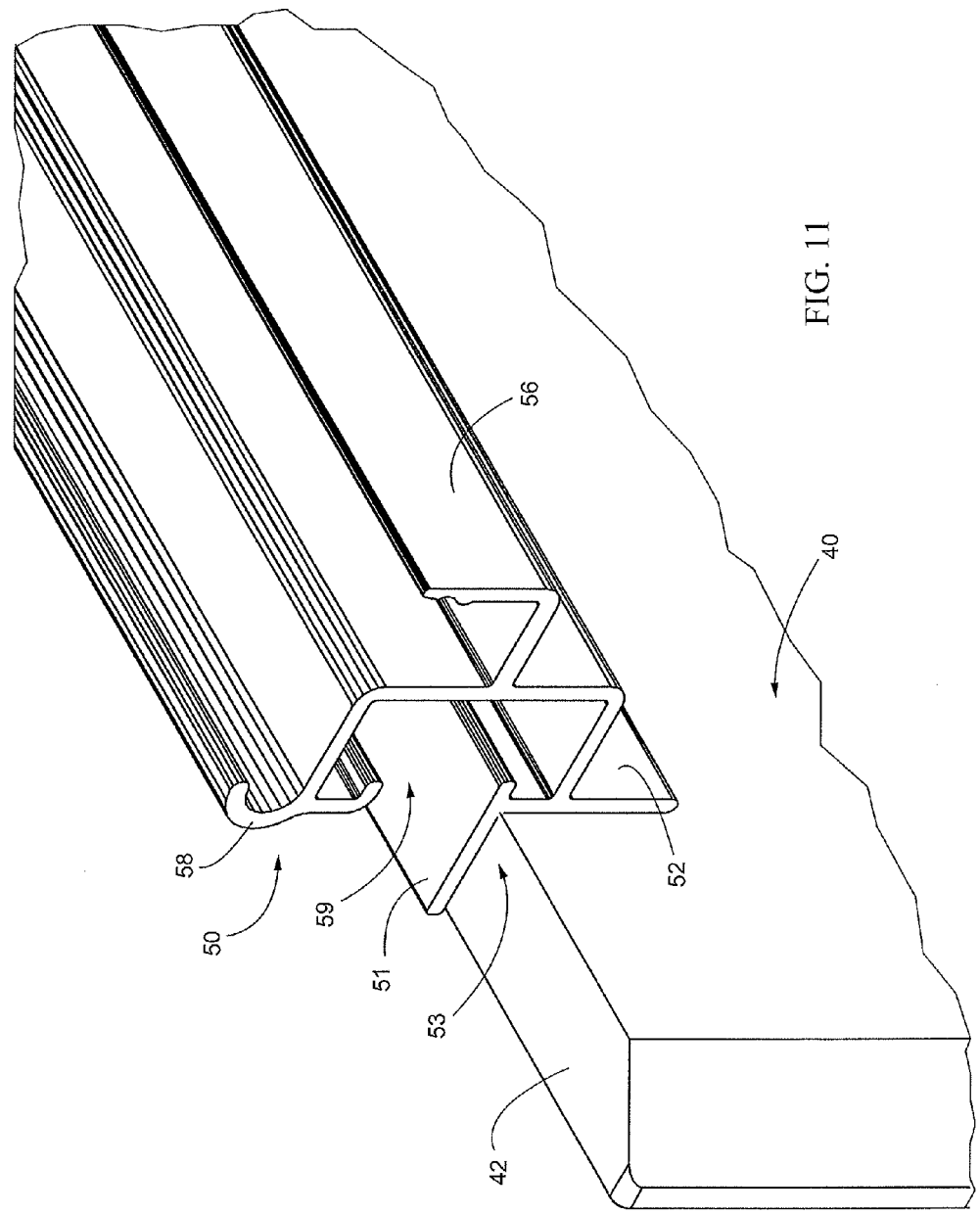
FIG. 11 is an enlarged partial perspective view of the upper portion of the wall panel of FIG. 6 showing the upper panel mount attached to the wall panel.

FIG. 7 is an enlarged perspective view of the upper panel mount 50, with an enlarged end view shown in FIG. 8. The upper panel mount 50 includes a horizontal flange 51 and a vertical flange 52 which form an L-shaped panel seat 53 to receive the upper end of the panel member 42 as best illustrated in FIG. 11. Apertures 54 may be provided in the vertical flange 52 for receiving threaded connectors to secure the upper panel mount 50 to the upper end of the panel member 42. The upper panel mount 50 also includes an upwardly projecting vertical flange 56 and an upwardly projecting curved flange 58, which cooperate with the top member mount 70 for securing the top member 80 to the wall panels 40, as described later. The upper panel mount also includes a C-shaped track 59, the purpose of which is discussed later.

Figure 12:
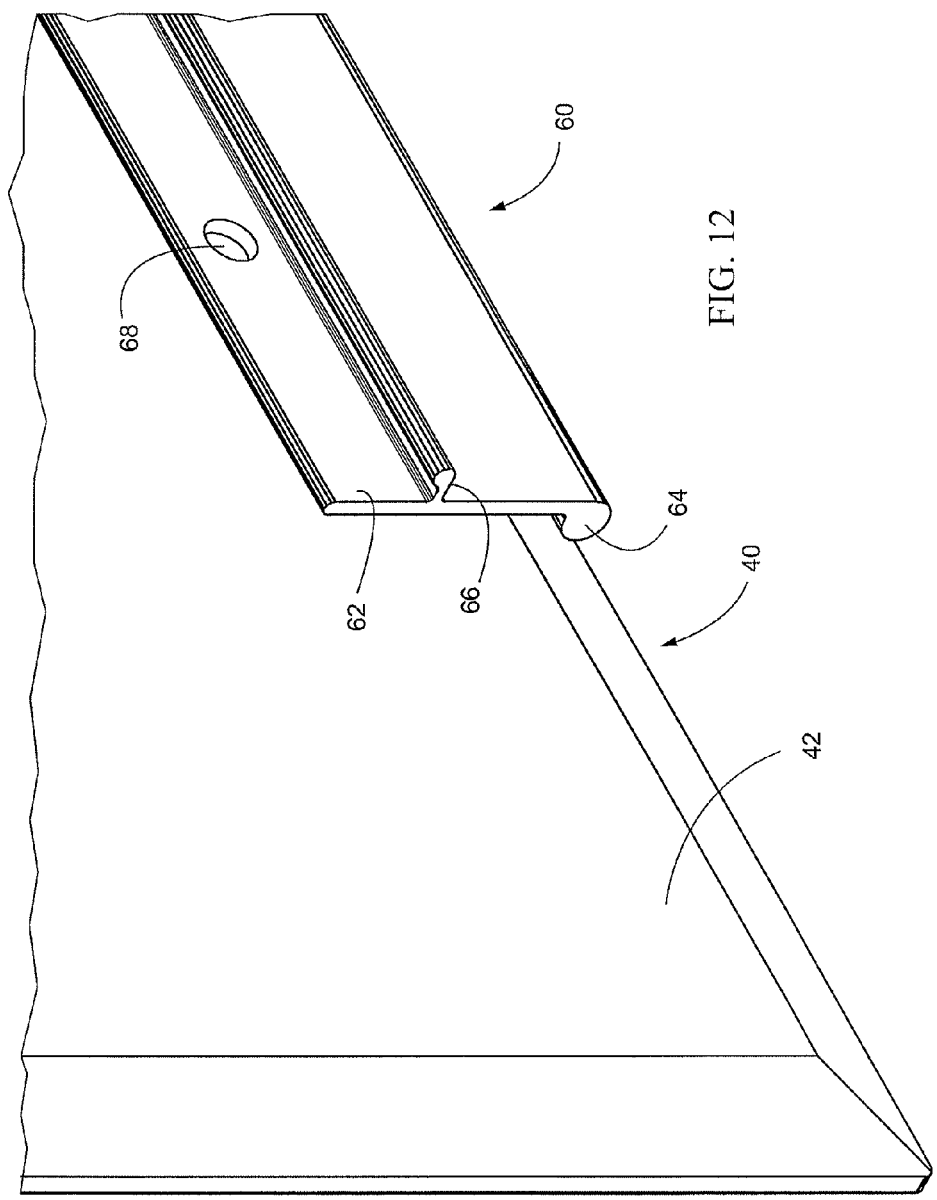
FIG. 12 is an enlarged partial perspective view of the lower portion of the wall panel of FIG. 6 showing the lower panel mount attached to the wall panel.

FIG. 9 is an enlarged perspective view of the lower panel mount 60, with an enlarged end view shown in FIG. 10. The lower panel mount 60 includes a substantially flat mount body 62 with a bulbous end 64 and a bulbous projection 66, which cooperate with the base assembly 20 described later. Apertures 68 may be provided in the mount body 62 for receiving threaded connectors to secure the lower panel mount 60 to the lower end of the panel member 42 as shown in FIG. 12.

FIGS. 9 and 10 also show the top member mount 70 which is identical to the lower panel mount 60, and includes a corresponding substantially flat mount body 72 with a bulbous end 74 and a bulbous projection 76, which cooperate with the upper panel mount 50 for securing the top member 80 to the wall panels 40, as described later. Apertures 78 may be provided in the mount body 72 for receiving threaded connectors to secure the top member mount 70 to the underside of the top member 80 as shown in FIGS. 17, 18 and 20.

Figure 14:
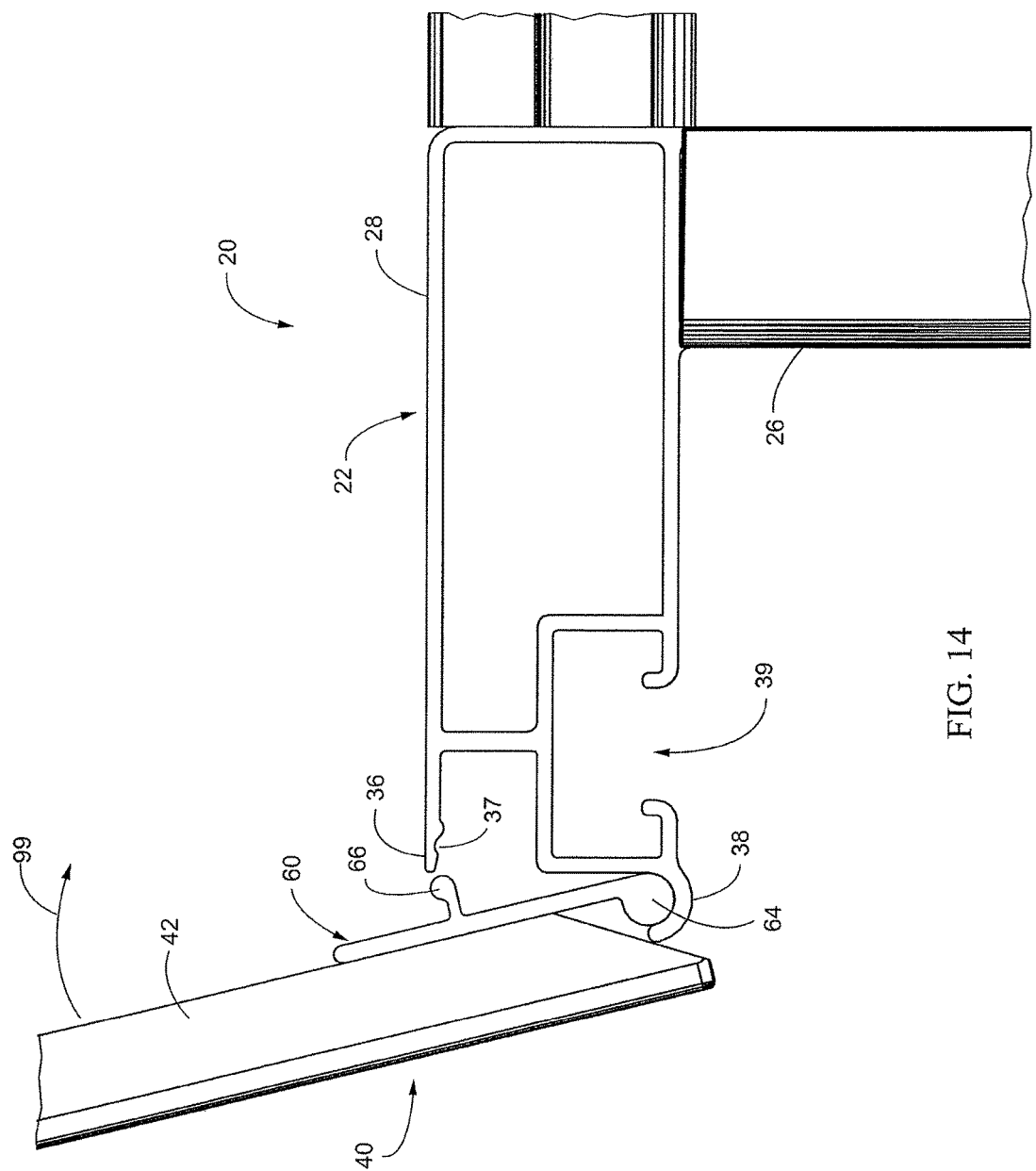
FIG. 14 is an enlarged elevation view showing the lower panel mount being positioned in the base assembly.
Figure 15:
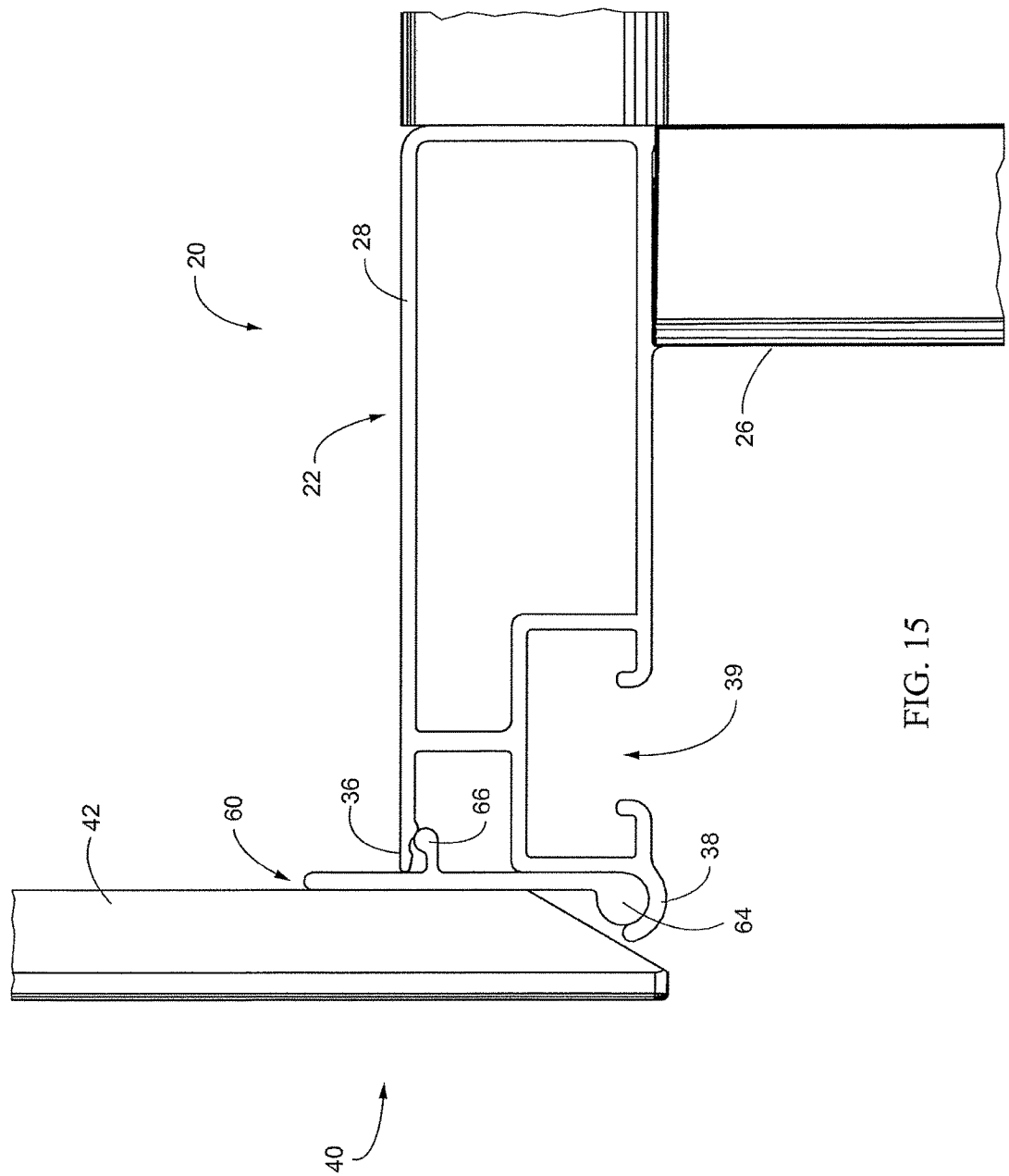
FIG. 15 is the same view as FIG. 14 showing the lower panel mount secured into the base assembly.

FIGS. 13-22 illustrate the steps in assembling the modular table system 10. The base assembly 20 is pre-assembled as described above. The pre-assembled base assembly 20 is positioned on a floor or other surface. A user then positions a first wall panel 40A over the base assembly 20 (FIG. 13) such that the bulbous end 64 of the lower panel mount 60 is received within the upwardly curved flange 38 of a first base members 22A of the base assembly 20 (FIG. 14). The first wall panel 40A is then rotated inwardly as indicated by arrow 99 in FIG. 14 until the bulbous projection 66 is frictionally engaged with the outwardly projecting flange 36 of the base member 22 (FIG. 15). Referring to FIGS. 14 and 15, the end of the outwardly projecting flange 36 is configured to slidably receive the bulbous projection 66 as the wall panel 40 is rotated inwardly. A recess 37 may be provided in the underside of the outwardly projection flange 36 to receive the bulbous projection 66 to retain the first wall panel 40A in a substantially vertical position while the second wall panel 40B is being retrieved. The above process is repeated with a second wall panel 40B positioned in the base assembly 20 with respect to a second base member 22B adjacent to the first base member 22A.

Figure 17:
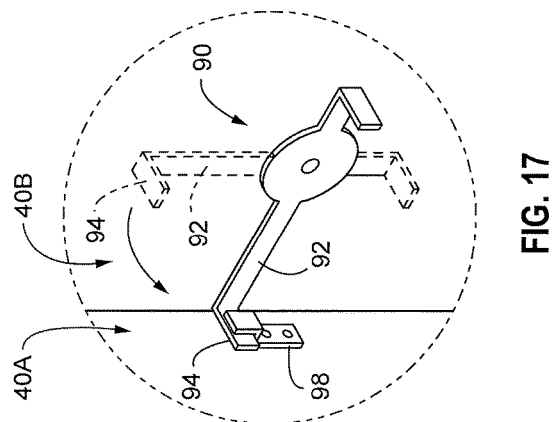
FIG. 17 is an enlarged perspective view of the circled area of FIG. 16 showing an embodiment of a panel lock.
Figure 16:
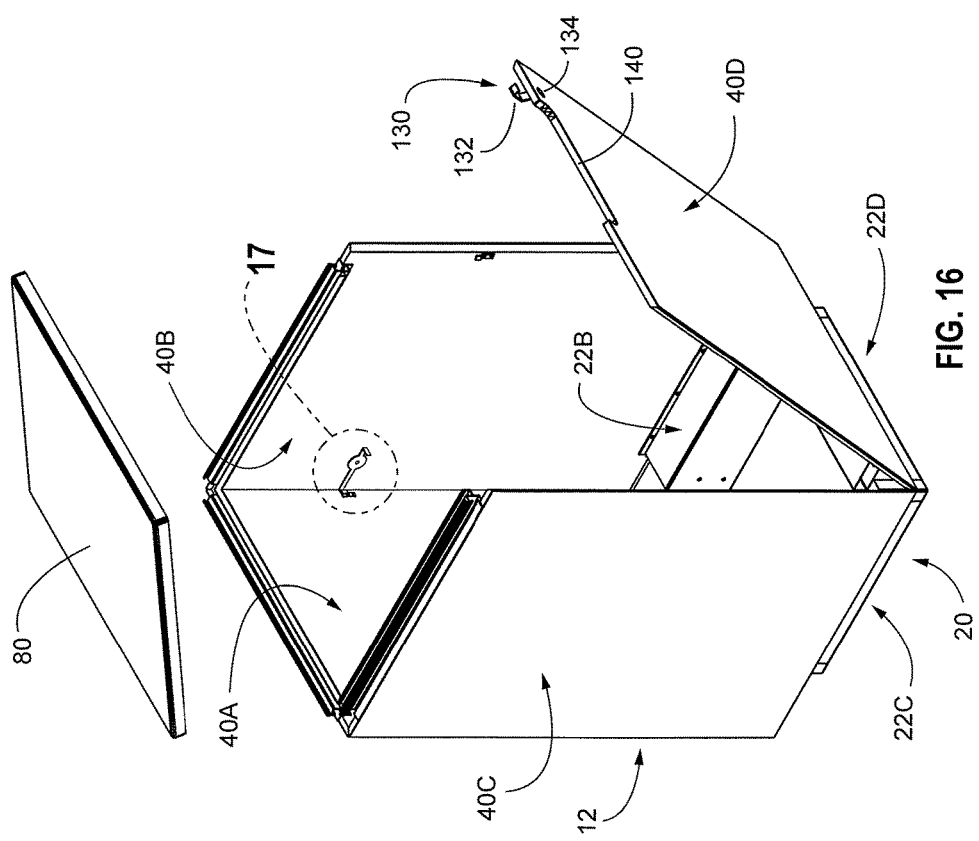
FIG. 16 is a perspective view of the modular table system of FIG. 1 at a later assembly stage.

Referring to FIGS. 13, 16 and 17, the two adjacent wall panels 40A, 40B are then locked together by a panel lock 90. The panel lock 90 comprises an arm 92 with a lateral hook 94. The arm 92 is pivotally secured to the inside of each wall panel 40 near one vertical edge. Near the opposite vertical edge of each wall panel 40 is a vertically aligned upwardly projecting hook 98 secured to the inside of the panel member. Thus, when two adjacent wall panels 40 are positioned next to one another with their opposing vertical edges aligned, the lateral hook 114 can be pivotally rotated (FIG. 17) to be received by the upwardly projecting hook 98 of the adjacent wall panel, thereby locking the adjacent wall panels together.

The above process is then repeated for the third wall panel 40C, and so on, until each of the wall panels 40 are positioned into the base assembly 20 and adjacent wall panels are locked together by the panel locks 90 (except as discussed below when one of wall panels is removable or includes a hinged access door, the removable wall panel or hinged access door is not locked to adjacent wall panels). It should be appreciated that with the panel locks 90 securing adjacent wall panels together and with lower panel mounts 60 engaged with the base assembly 20, a substantially laterally stable pedestal 12 is achieved onto which the top member 80 is received.

It should be appreciated that the vertical edges of the wall panels 40 may include a 45 degree miter such that when the adjacent wall panels are secured together by the panel locks 90, a 90 degree aesthetically pleasing corner is formed. Of course, if the pedestal 12 has a shape other than rectangular (e.g., triangular, trapezoidal, hexagonal, octagonal, etc.) the vertical edges may be mitered at an angle that corresponds to the angle of the corresponding shaped pedestal.

Referring to FIG. 16, once all of the wall panels are positioned in the base assembly and locked together, the top member 80 is ready to be attached to the assembled pedestal 12. The top member 80 may be any desired length and width or shape depending on the length, width and shape of the pedestal 12 to which it attaches. The top member 80 may be made of any suitable material. Like the wall panels 20, one type of material found to be particularly suitable is PVC wrapped MDF due to its relatively low cost and ability to resist scratching and chipping.

Referring to FIG. 18, the bottom surface of the top member 80 includes a recessed area 82 near its outer periphery for receiving the top member mount 70 (FIG. 19) and for receiving the top lock bracket 120 (FIG. 20). By positioning the top member mount 70 and top lock bracket 120 within a recessed area 82, these components are hidden from view providing a more finished and aesthetically pleasing furniture appearance when the modular table system 10 is assembled.

Figure 22:
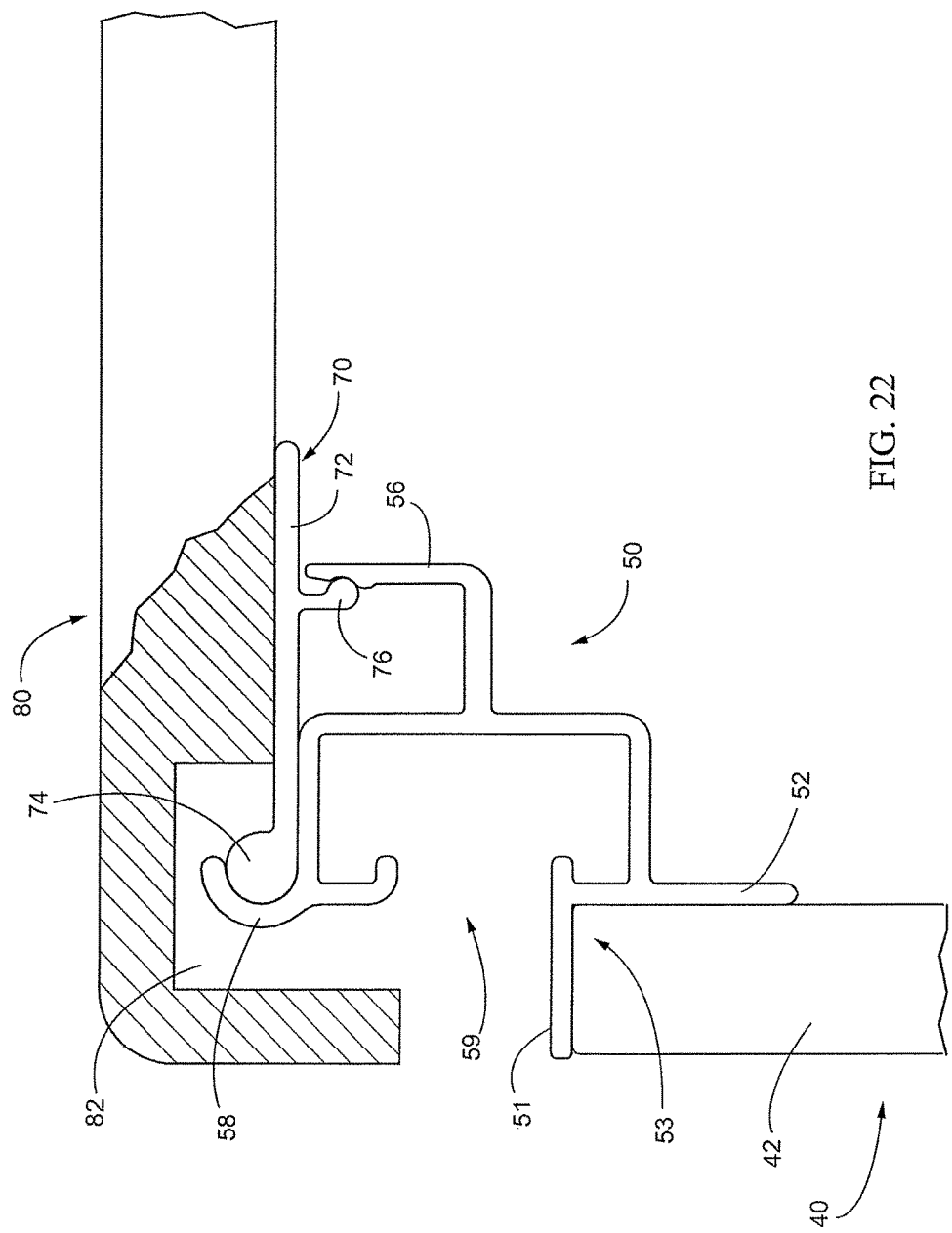
FIG. 22 is the same enlarged elevation view as FIG. 21 showing the top member mount secured within the upper panel mount.

Referring to FIGS. 16, 18, 20 and 21, it should be appreciated that only one top member mount 70 is provided on one end of the top member 80 for engaging with the upper panel mount 50 of one of the wall panels 40. To attach the top member 80 to the pedestal 12 formed by the wall panels 40, the top member 80 is positioned over the upper panel mount 50 of one of the wall panels and the bulbous end 74 of the top member mount 70 is inserted into one of the curved flange 58 of one of the upper panel mounts 50. The top member 80 is then rotated downwardly as indicated by arrow 122 in FIG. 21 until the bulbous projection 76 is frictionally engaged with the upwardly extending flange 56 of the upper panel mount 50. Referring to FIGS. 21 and 22, the end of the upwardly projecting flange 56 is configured to slidably receive the bulbous projection 76 as the top member 80 is rotated downwardly onto the pedestal. A recess 122 may be provided in the upwardly projecting flange 56 to receive the bulbous projection 76.

With the top member 80 in position over the pedestal 12 formed by the wall panels 40, the top member 80 may be secured to the pedestal 12. In one embodiment, the top member 80 is locked onto the pedestal 12 such that it may not be removed without a key, thereby providing a secure storage area within the pedestal 12. Referring to FIG. 16, at the inside upper end of one of the wall panels 40D is a top lock 130 comprising a hooked arm 132 secured to a keyed lock 134 into which a key (not shown) may be inserted from the outside of the wall panel 40D. When the keyed lock 134 is rotated with the key, the hooked arm 132 is caused to rotate and engages with the top lock bracket 120, thereby locking the top member 80 to the wall panel 40D, preventing removal of the top member 80 from the pedestal 12 until a key is reinserted into the keyed lock 134 to rotate the hooked arm 132 out of engagement with the top lock bracket 120.

In an alternative embodiment, rather than using a keyed lock 134 to secure the top member 80 to the pedestal 12, the top member may be secured to the pedestal using a fastener (such as a spring loaded pin or similar mechanical engagement mechanism) which engages with the upper panel mount 50 when the top member 80 is pushed down onto the top of the pedestal 12.

It should be appreciated that if it is desirable to remove the wall panel 40D while the top member 80 remains positioned over the top of the pedestal 12, the user may simply tilt the top of the wall panel 40D outwardly and then lift the wall panel 40D upwardly to remove the bulbous end 64 out of the upwardly curved flange 38 of the base member 22D. Of course, it should be appreciated, that the removable wall panel 40D, would not be locked to the adjacent wall panels 40B, 40C by the panel locks 90. It should also be appreciated that the upper end of wall panel 40D may include a recessed handhold or cutout 140 (FIG. 16) for receiving a user's hand to make it easier for the user to grab the upper end of the wall panel 40D to tilt it away from the pedestal while the top member 80 remains in place over the pedestal 12.

Figure 23:
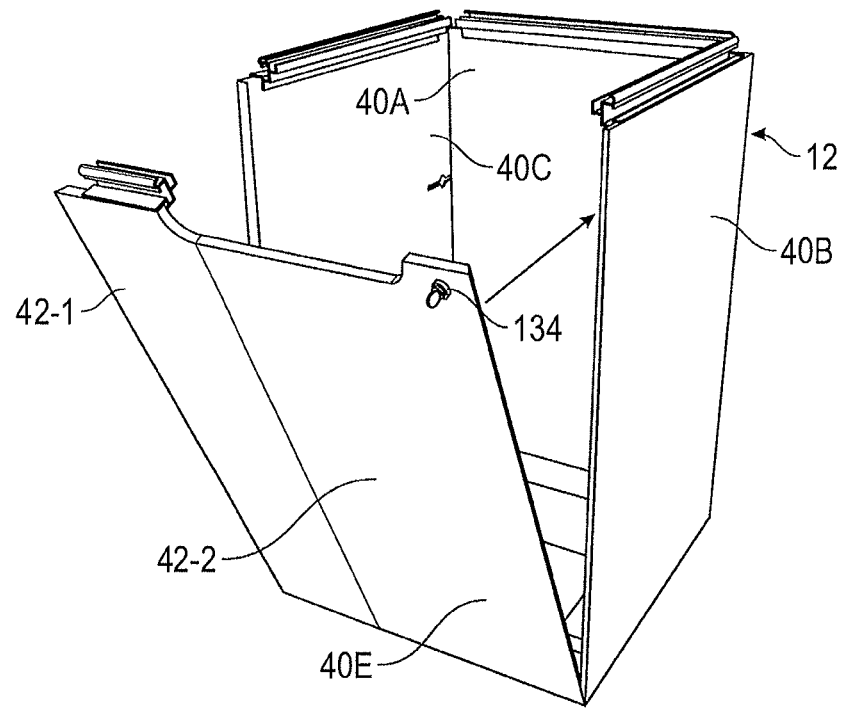
FIGS. 23 and 24 illustrate perspective views of an alternative embodiment of the modular table system in which one of the wall panels incorporates a hinged door.
Figure 24:
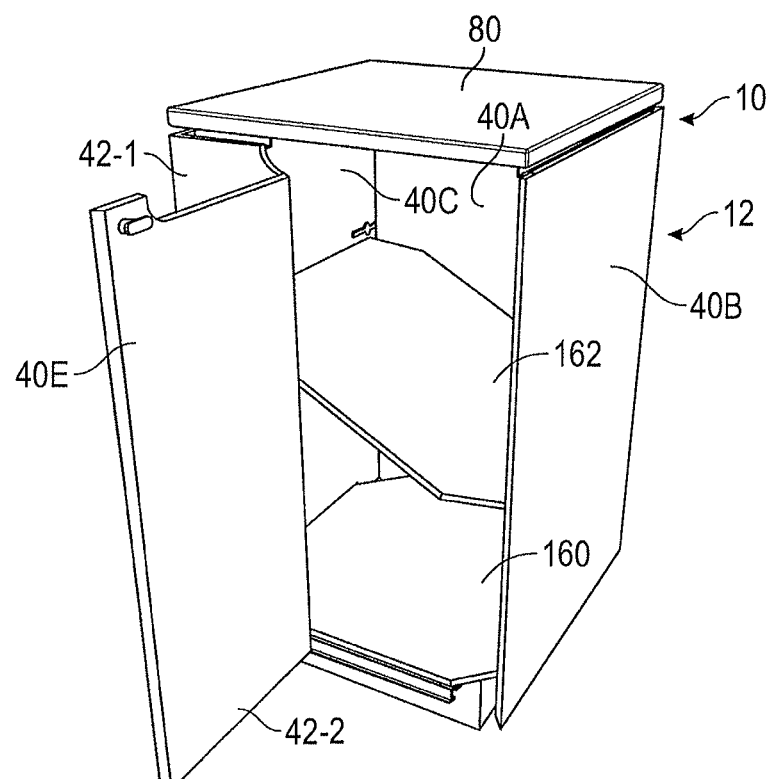

FIGS. 23 and 24 illustrate an alternative embodiment of the modular table system 10 in which one of the wall panels 40E includes a hinged door 42-2 attached to a narrow panel member 42-1. Apart from the hinged door 42-2, the embodiment of the wall panel 40E is substantially identical to the previously described removable wall panel 40D. The only difference being, that the lower panel mount 60 is only attached to the narrow panel member 42-1, thereby allowing the hinged door to 42-2 to swing outwardly when the top lock 130 attached to the hinged door 42-2 is unlocked (in embodiments with the top lock), while the narrow panel member 42-1 remains securely retained in place by the cooperation of the lower panel mount 60 with the base assembly 20 and due to the panel lock 90 locking the narrow panel member 42-1 to the adjacent wall panel 40C.

In any of the embodiments, a bottom shelf panel 160 (FIG. 24) may be placed over the base assembly 20 and one or more intermediate shelf panels 162 (FIG. 24) may be supported on the wall panels 40 by pegs or other suitable shelf supports at a desired elevation within the pedestal 12.

Figure 25:
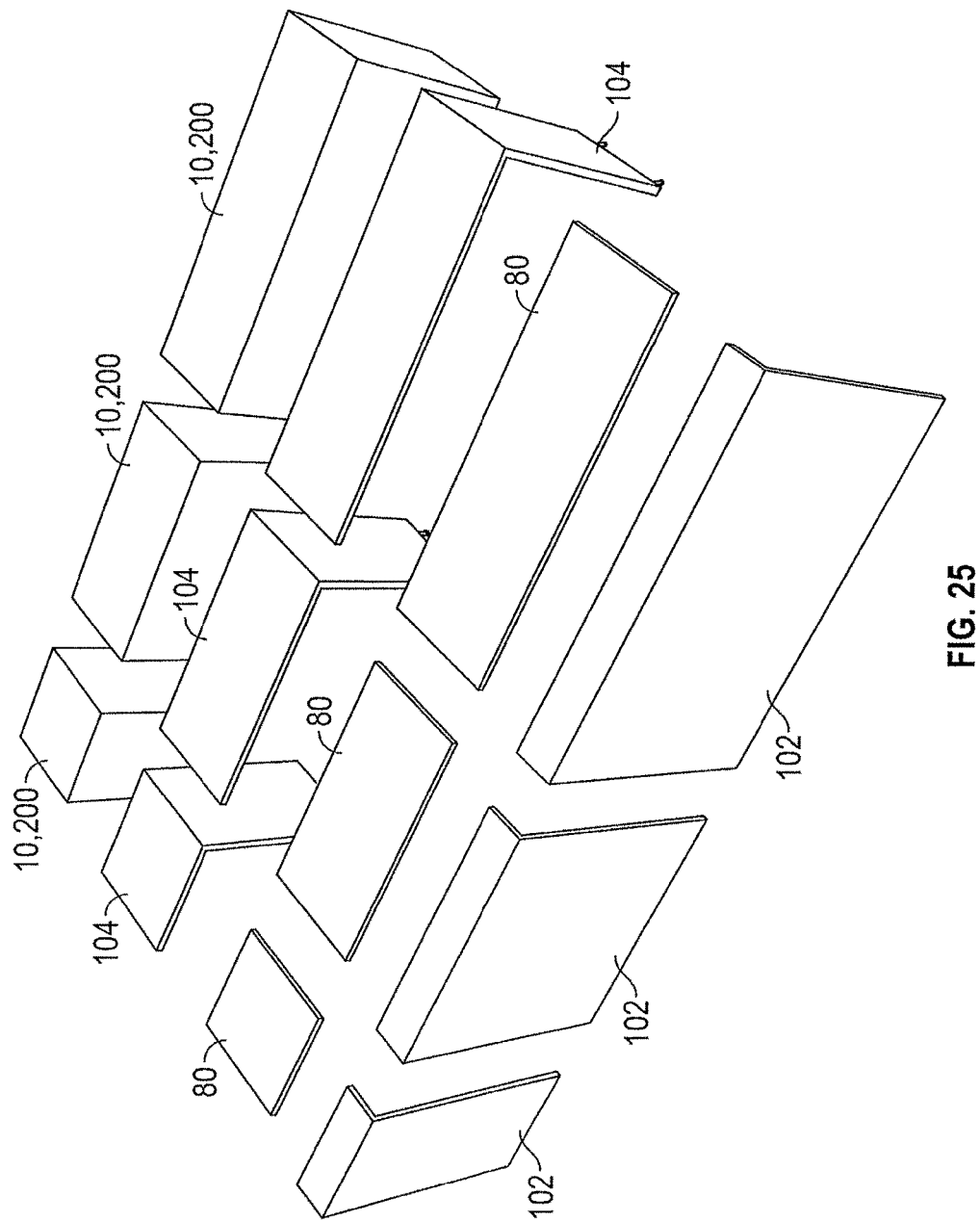
FIG. 25 illustrates various sized rectangular modular table systems and accessories.
Figure 26:
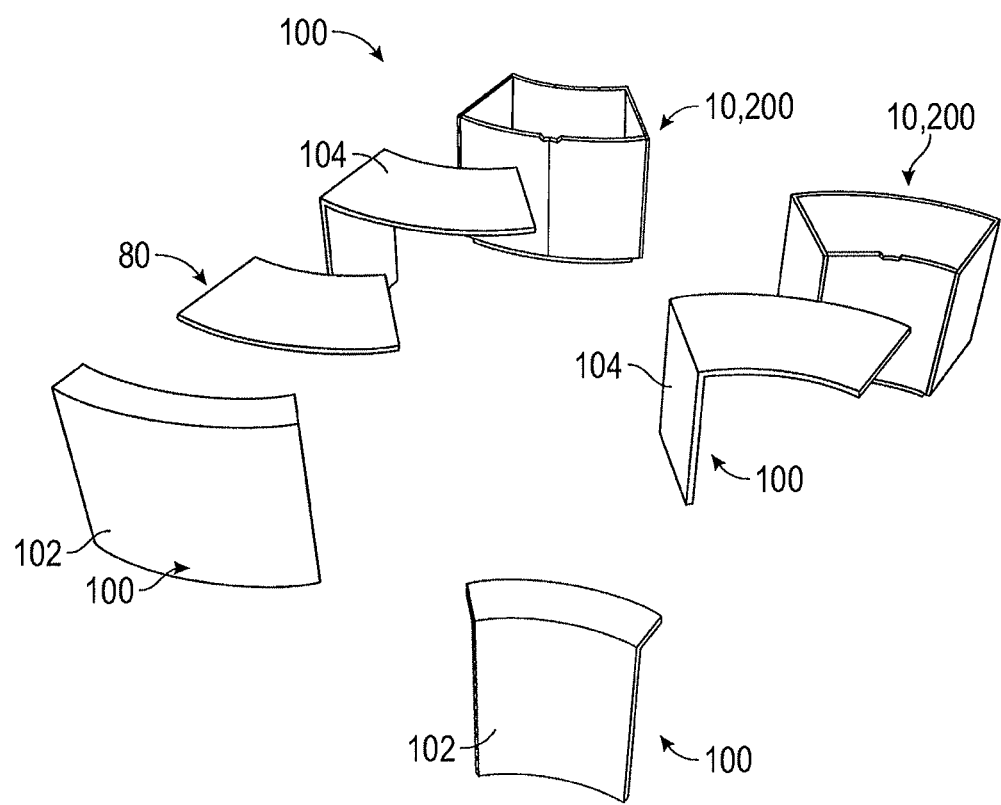
FIG. 26 illustrates various sized curved modular table systems and accessories.
Figure 27:
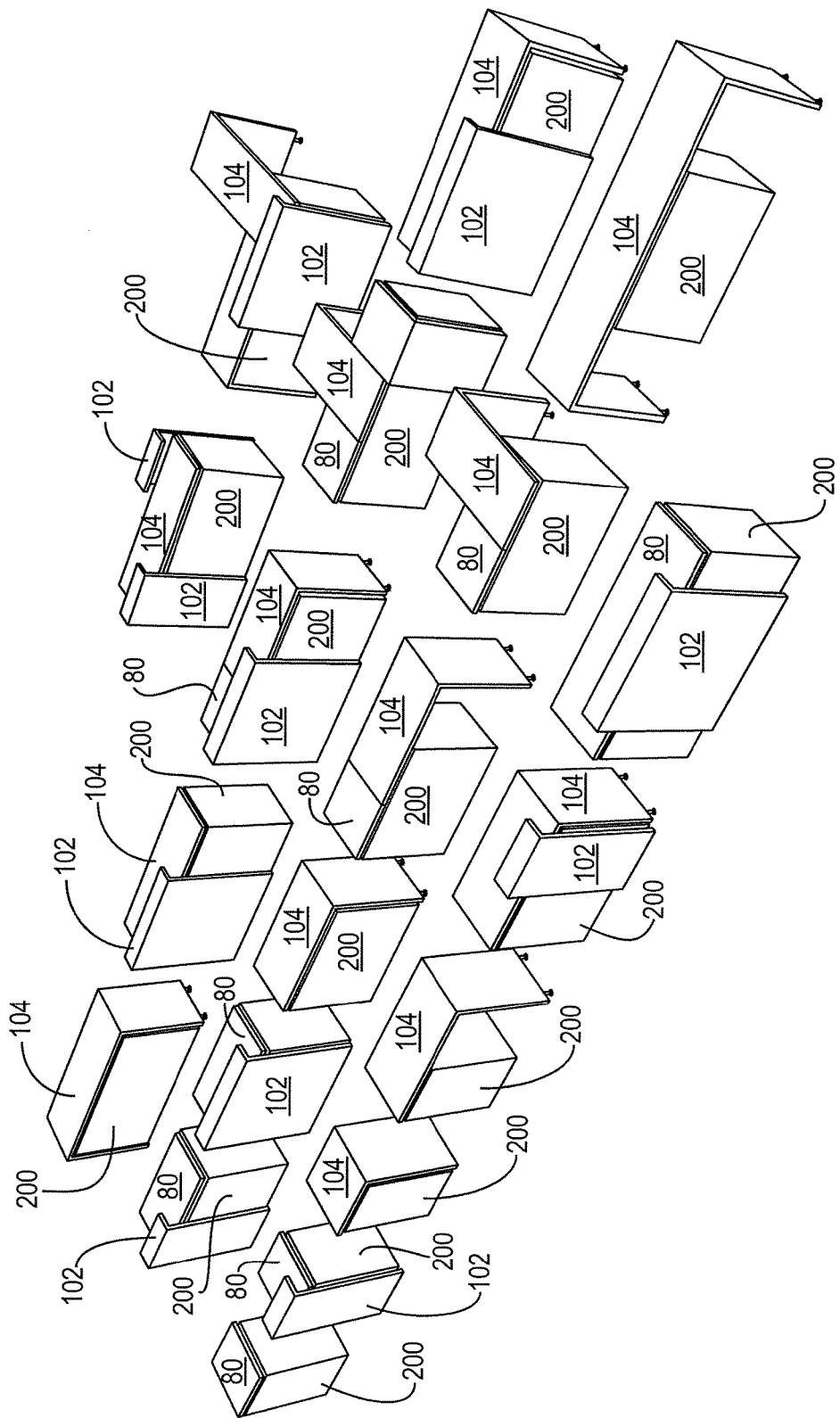
FIGS. 27-28 illustrate various combinations and sizes of rectangular modular table systems with accessories.
Figure 28:
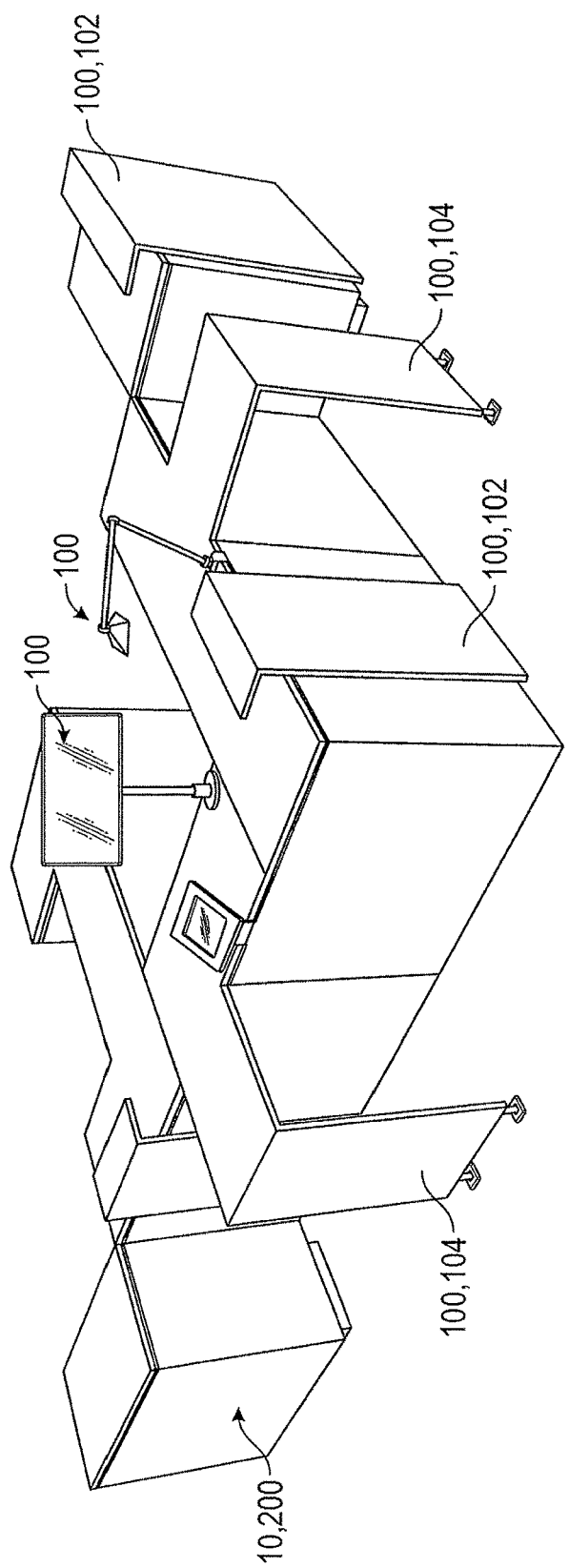

FIGS. 25 and 26 illustrate various shapes and sizes of rectangular and curved modular table systems 10 with various accessories 100, including various length rectangular drop ledges 102 and various length rectangular "drop tops" 104. Other accessories 100 are shown in FIG. 28, which accessories 100 may include monitors, iPads, tablets or other computer peripherals, lamps and other lighting fixtures, shelves, hang rails, fascia panels, standoff graphics, etc.

Figure 31:
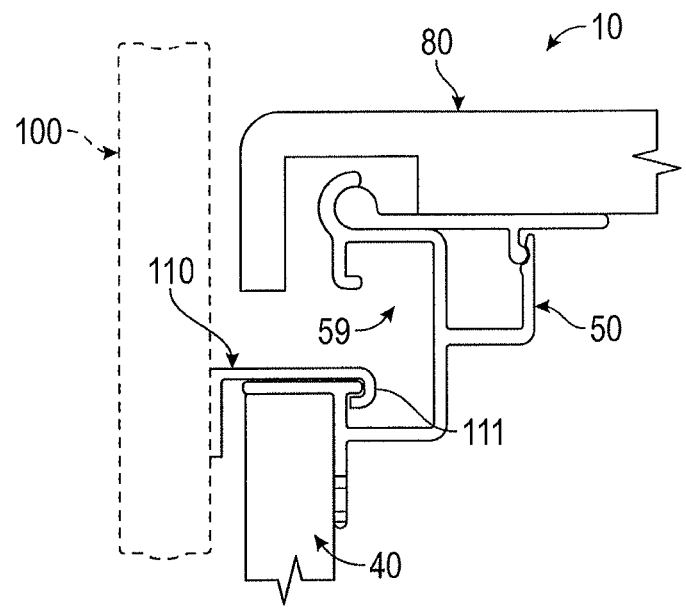
FIG. 31 illustrates an embodiment of an accessory mount for securing accessories to the modular table systems.
Figure 32:
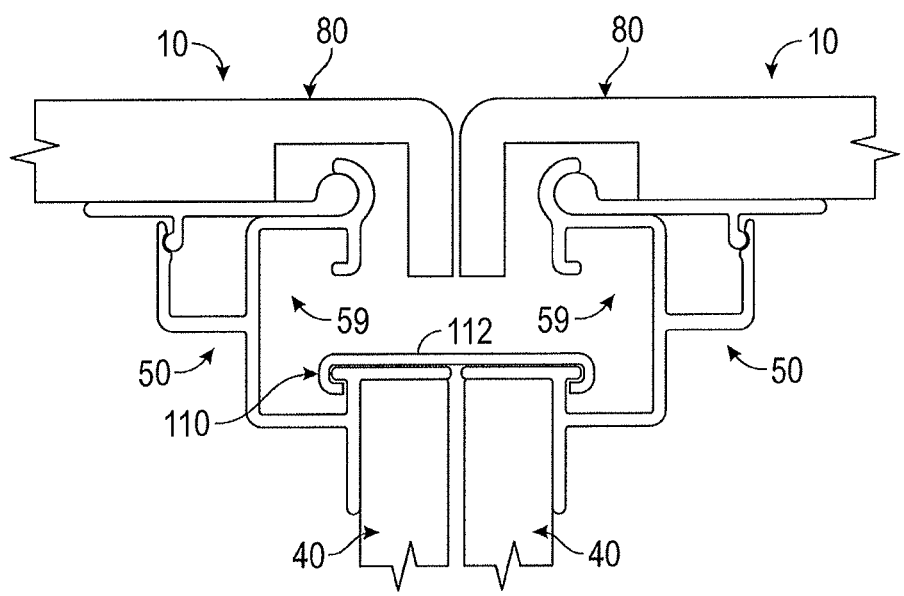
FIG. 32 illustrates an embodiment of a connector for securing two modular table systems together.

The accessories 100 may be attached to the modular table systems 10 by accessory mounts 110 such as brackets 111 which are configured to engage with the C-shaped tracks 59 of the upper panel mounts 50 as shown in FIG. 31. The C-shaped tracks 59 may also be used with a complimentary bracket 112 for securing two modular table systems together as shown in FIG. 32. Various other configurations of accessory mounts 110 may also be provided which cooperate with the tracks 59 or other components of the modular table systems 10 for attaching accessories or joining table systems together.

Additionally, it should be appreciated that the C-shaped tracks 39, 59 serve as a convenient means of routing and hiding power cords for the accessories 100. The tracks 39, 59 may be used for routing LED lights for providing recessed accent lighting below the top member 80 or around the base of the pedestal 12.

FIGS. 27-30 illustrate various modular table systems 10 and accessories which may be combined to produce a wide variety of shapes, sizes and configurations of modular tables systems for various uses.

Figure 33:
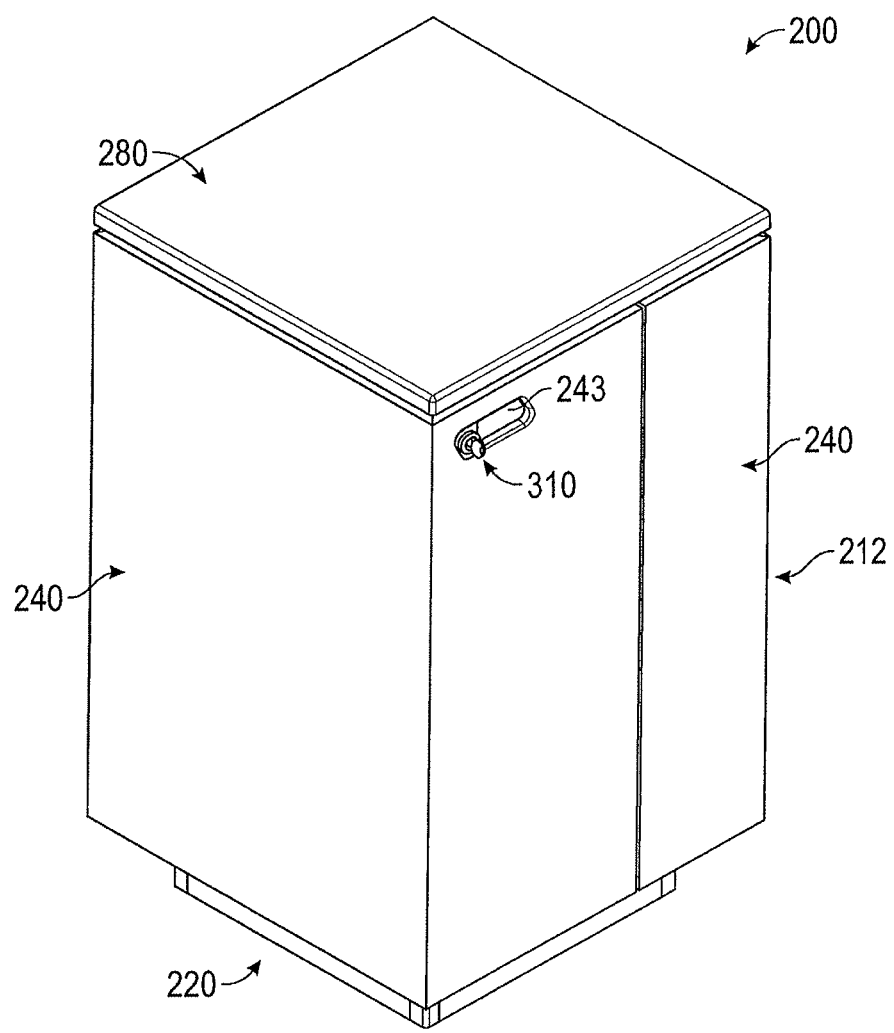
FIG. 33 is a perspective view of another embodiment of a modular table system.

FIG. 33 is a perspective view of anther embodiment of a modular table system 200. As in the previous embodiments, the modular table system 200 is comprised of a base assembly 220 which supports wall panels 240 around its periphery defining a pedestal 212. A top member 280 attaches to the top of the pedestal 212 thereby defining an enclosed area within the pedestal 212.

Figure 34:
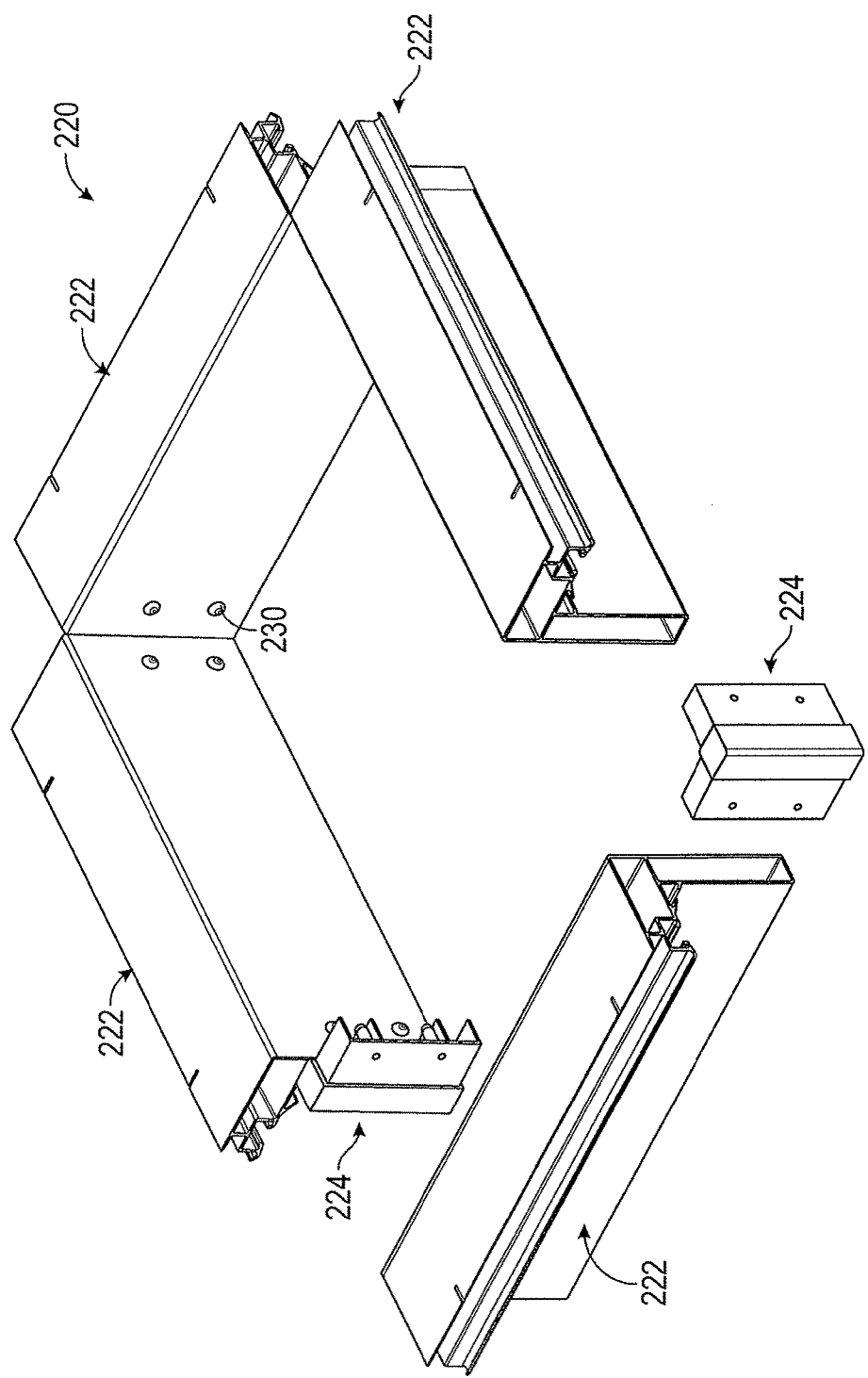
FIG. 34 is an exploded perspective view of an embodiment of a base assembly of the modular table system of FIG. 33.
Figure 35:
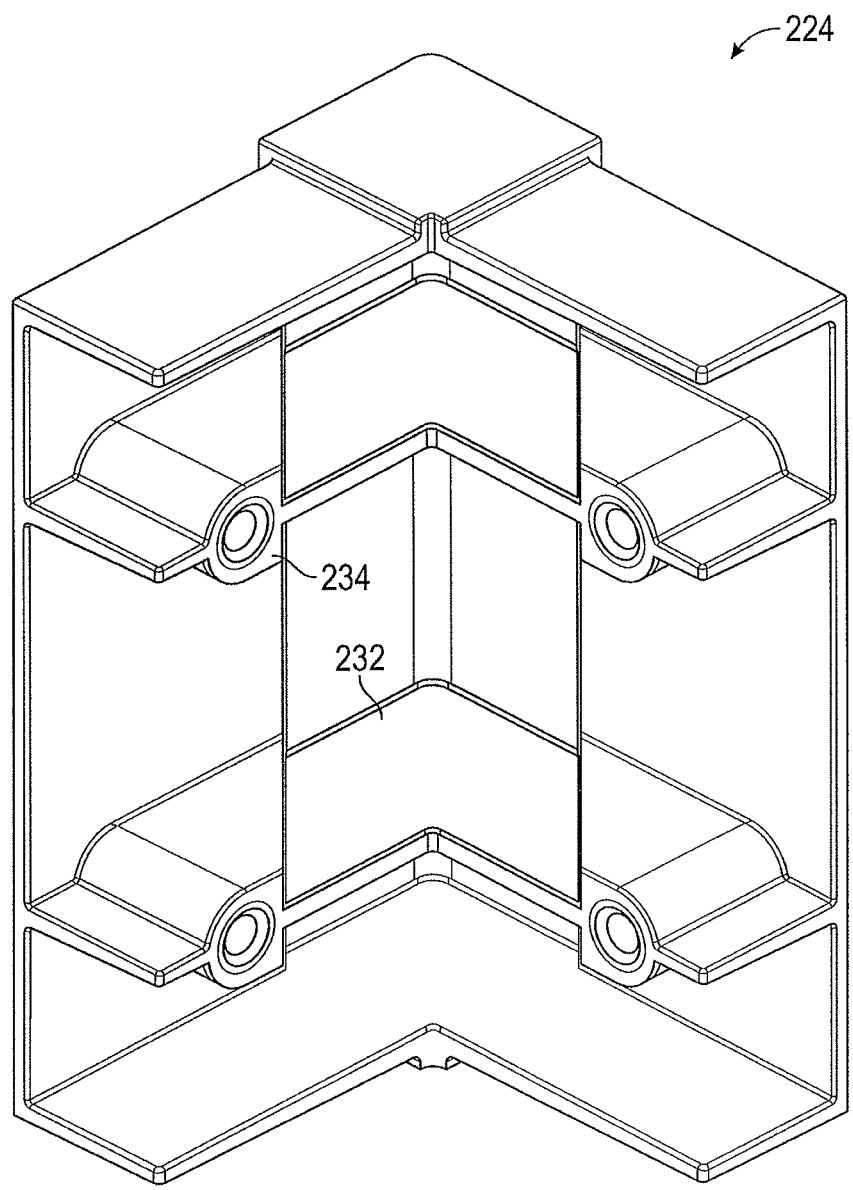
FIG. 35 is an enlarged perspective view of an embodiment of a corner connector for the base assembly of FIG. 34.
Figure 45:
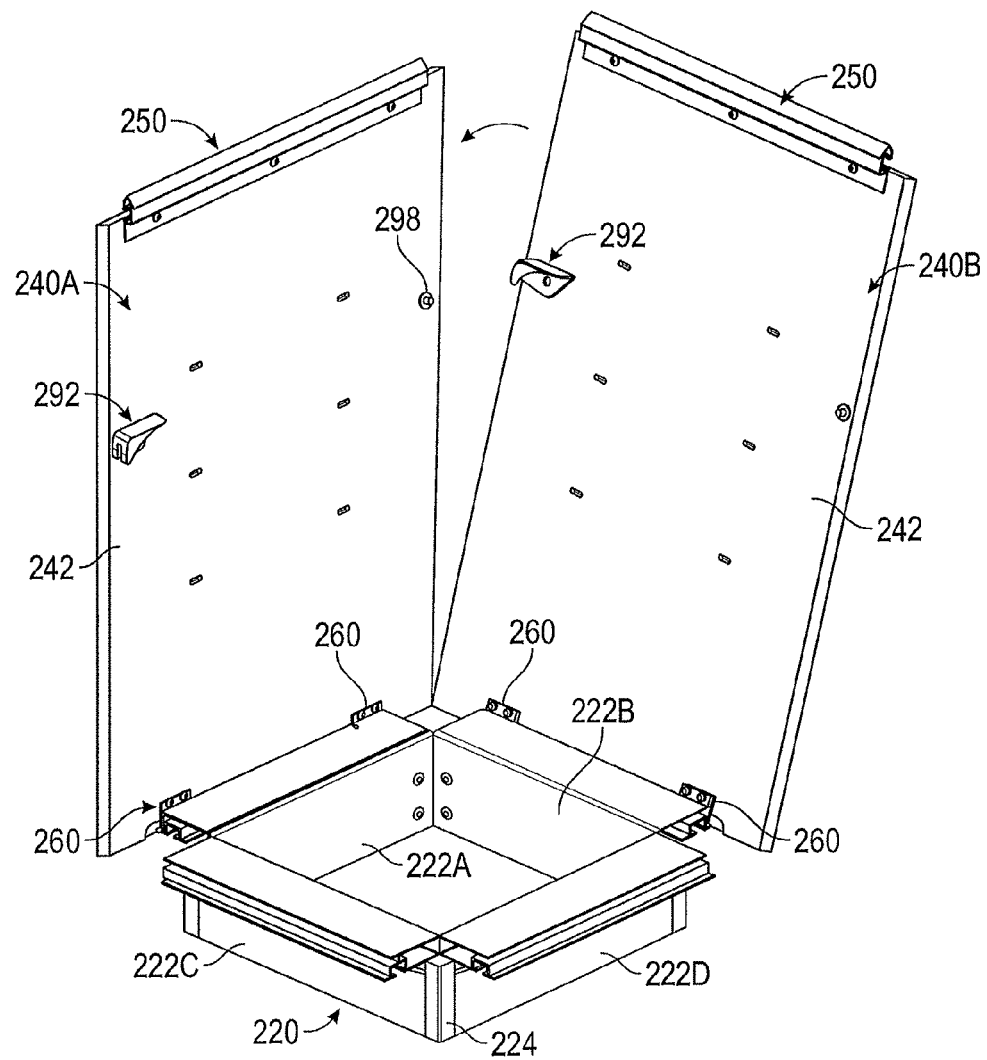
FIG. 45 is a perspective view of the modular table system of FIG. 33 at an initial assembly stage of two wall panels positioned into the base assembly.

The base assembly 220 is best illustrated in FIGS. 34 and 35. FIG. 45 shows the fully assembled base assembly 220 and FIG. 34 is a partially exploded perspective view of the base assembly 220. In this embodiment, the base assembly is comprised of four base members 222 joined together by corner connectors 224 forming a square base assembly. It should be appreciated, however that the base assembly 220 may be triangular, rectangular, trapezoidal, hexagonal, octagonal or any other desired shape by varying the lengths and numbers of the base members 22 joined together. The base members 222 may also be curved if a curved modular table system is desired, such as shown in FIG. 29.

Figure 36:
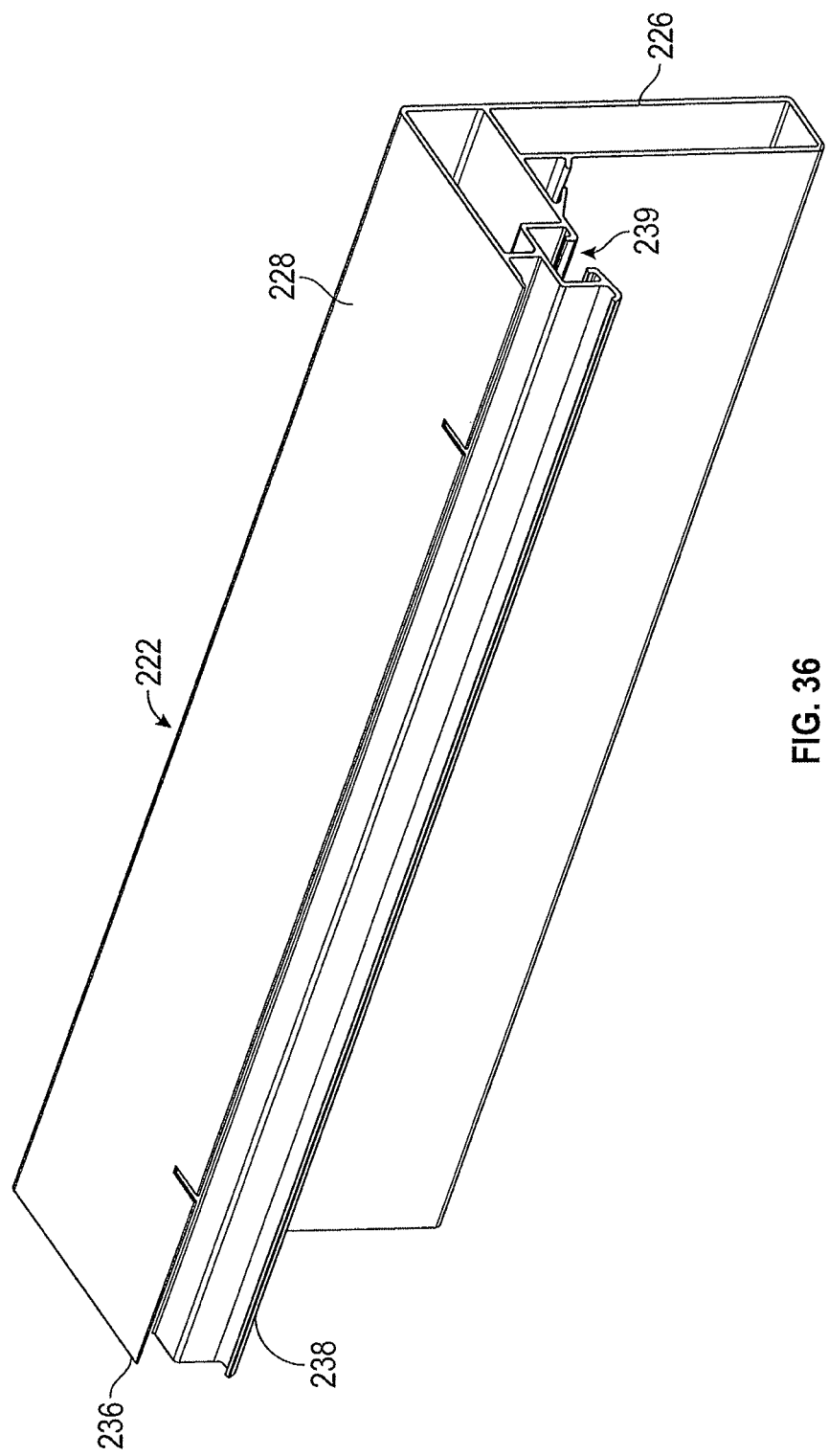
FIG. 36 is an enlarged perspective view of an embodiment of a base member for the base assembly of FIG. 34.
Figure 37:
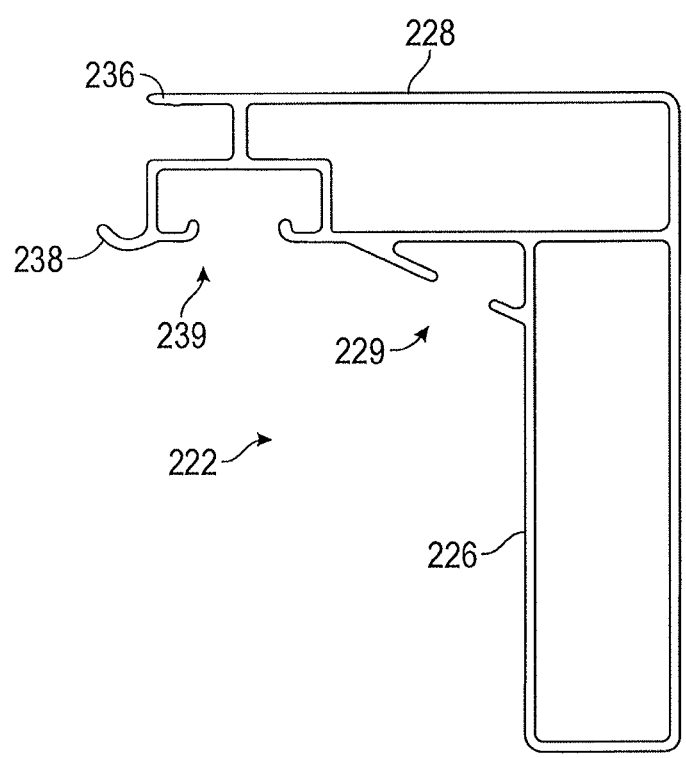
FIG. 37 is an end elevation view of the base member of FIG. 36.

An enlarged perspective view of one embodiment of the base members 222 is shown in FIG. 36 with an enlarged end elevation view shown in FIG. 37. As in the previous embodiment, the base members 222 may be an extrusion, or fabricated from rolled shapes or plate joined together and may be comprised of aluminum, steel, plastic or other suitable material. The base member 222 are substantially the same as the base members 22 of the previous embodiment and include a vertical leg 226 and a horizontal leg 228 and are joined together by corner connectors 224 received into the ends of the vertical legs 226. However, the base members 222 include an additional channel 229 formed in the corner at the intersection of the horizontal leg 228 and vertical leg 226 for hiding and routing electrical wires, signal wires or LEDs for providing base lighting around the base assembly 220. Taping screws 230, rivets or other connectors may be used to secure the base members 222 to the corner connectors 224 thereby forming the base assembly 220. Although the corner connectors 224 are shown as 90 degree angles, the corner connectors 224 may form any desired angle depending on the number of sides and shape desired for the pedestal 12 of the modular table system 10. The corner connectors 24 may incorporate webs 232 and sockets 234 for added rigidity and to securely hold the tapping screws 230 or other connectors.

The horizontal leg 228 of the base member 222 includes an outwardly projecting upper flange 236 and an outwardly projecting curved flange 238, which cooperate with the lower panel mounts 260 for securing the wall panels 240 to the base assembly 220 in substantially the same manner as described above and as discussed later. The horizontal leg 228 also forms a C-shaped track 239, the purpose of which is discussed later.

Figure 38:
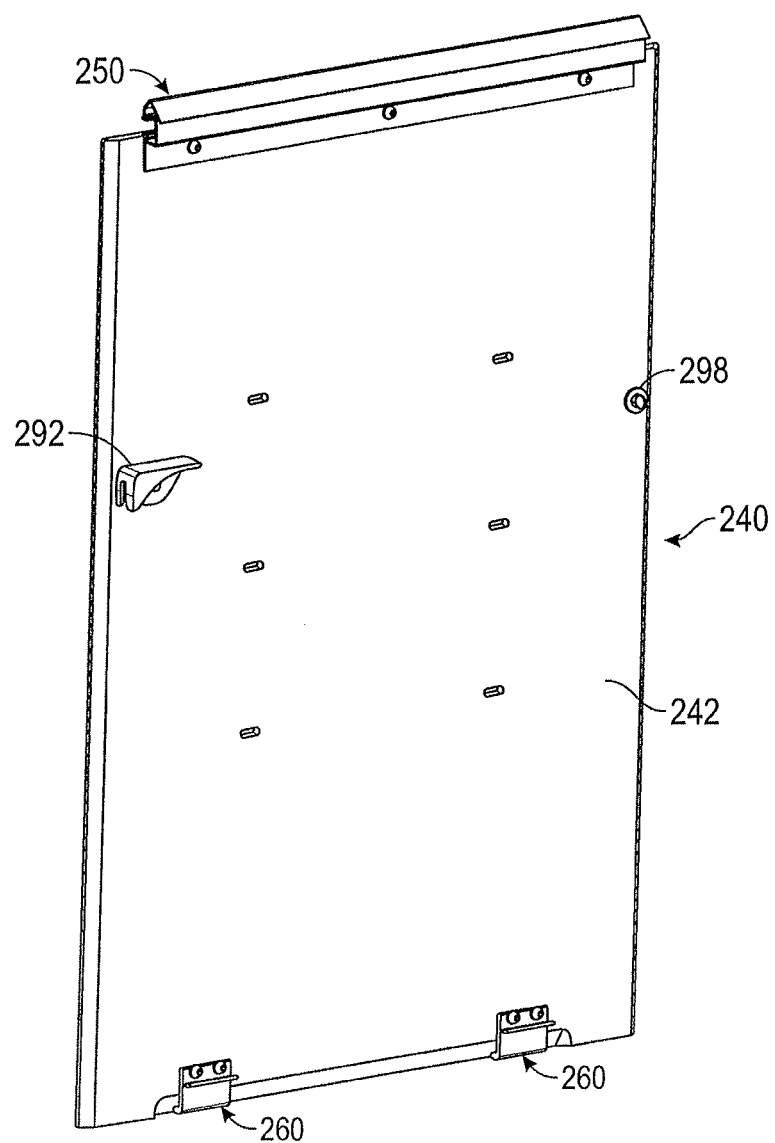
FIG. 38 is a perspective view of an embodiment of a wall panel of the modular table system of FIG. 33 showing upper and lower panel mounts.
Figure 48:
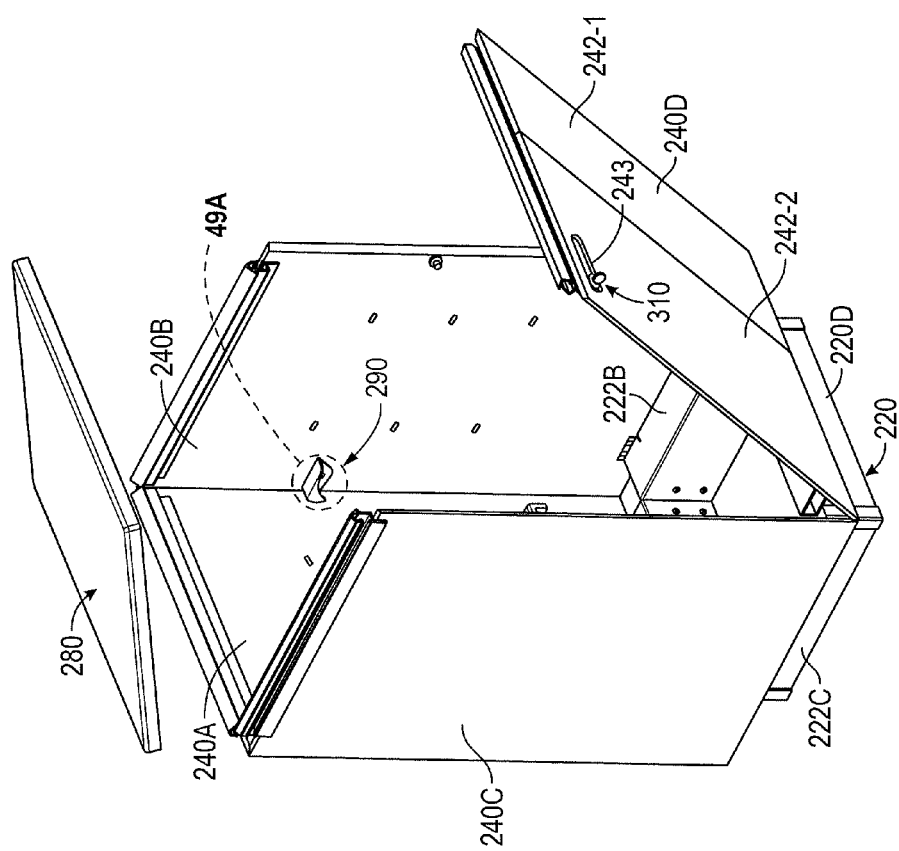
FIG. 48 is a perspective view of the modular table system of FIG. 33 at a later assembly stage.

FIG. 38 is a perspective view of one of the wall panels 240. The wall panel 240 is comprised of a panel member 242 to which is secured an upper panel mount 250 and a lower panel mount 260. As with the previous embodiment, the panel member 242 may be made from any suitable material such as PVC wrapped MDF due to its relatively low cost and durability in resisting scratches and chipping. The wall panel 240 may have any desired length and height depending on the desired length, height and shape of the modular table system 200. As illustrated in FIGS. 33 and 48, one of the wall panels 240D includes a door panel 242-2 which is hingedly attached to a narrow wall panel 242-1. The door panel 242-2 may include a cut-out handle 243 into which the user may insert his or her hand to open the door panel 242-2. The hinged door 242-2 of the modular table system 200 may include a keyed door lock 310. The keyed door lock may be any suitable type of conventional lock, including the type in which a lever (not shown) on the inside of the door panel 242-2 rotates as the key is rotated to engage with a slot or projection (not shown) on the adjacent wall panel 240C.

Figure 39:
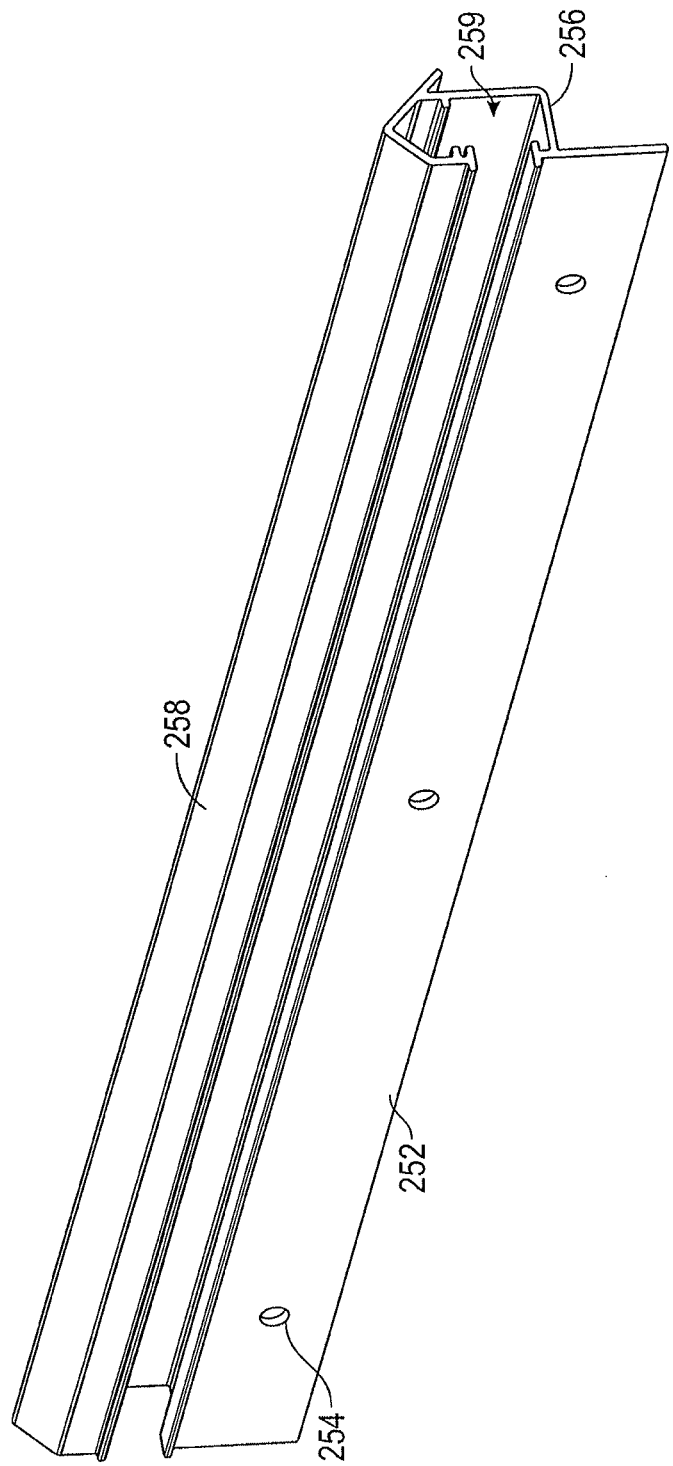
FIG. 39 is an enlarged perspective view of an embodiment of the upper panel mount of FIG. 38.
Figure 40:
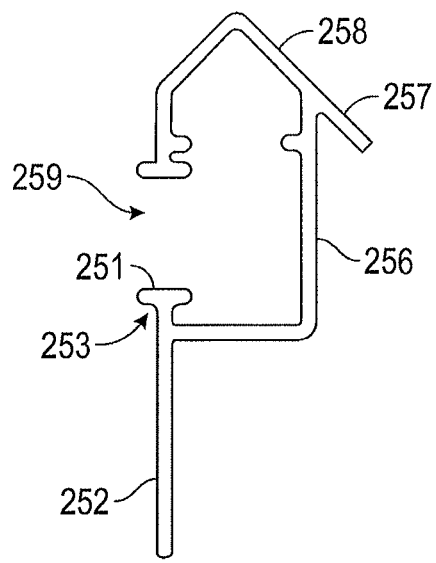
FIG. 40 is an end elevation view of the upper panel mount of FIG. 39.
Figure 43:
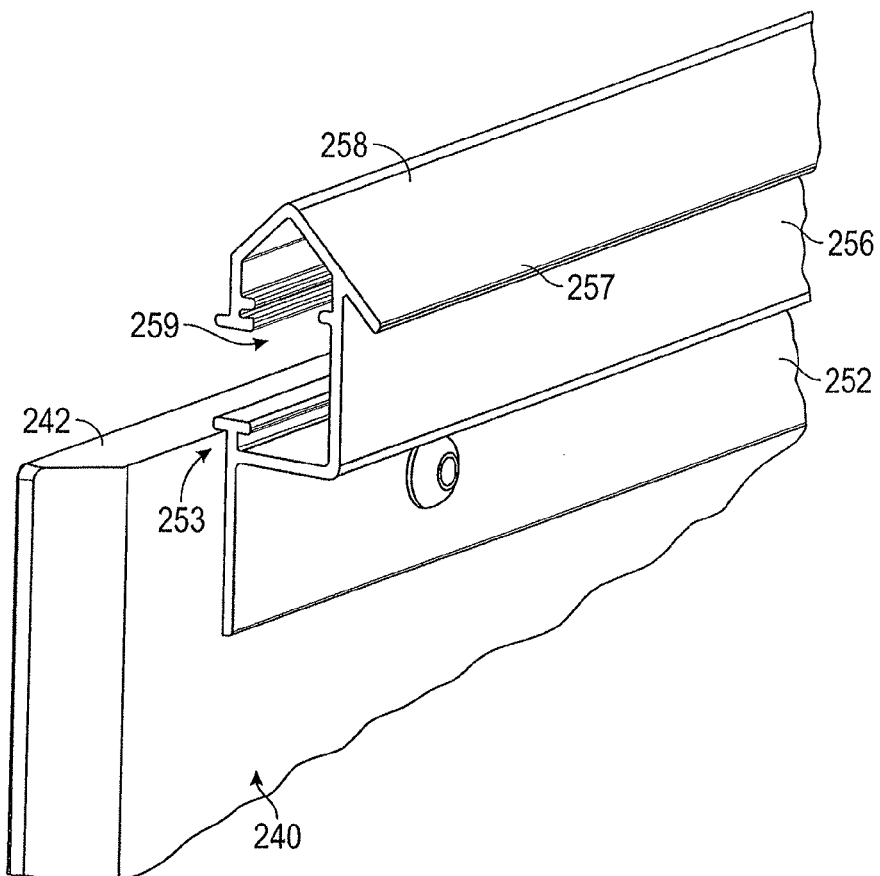
FIG. 43 is an enlarged partial perspective view of the upper portion of the wall panel of FIG. 38 showing the upper panel mount attached to the wall panel.

FIG. 39 is an enlarged perspective view of the upper panel mount 250, with an enlarged end view shown in FIG. 40. The upper panel mount 250 includes a horizontal flange 251 which intersects with a vertical flange 252 forming panel seat 253 to receive the upper end of the panel member 242 as best illustrated in FIG. 43. Apertures 254 may be provided in the vertical flange 252 for receiving threaded connectors to secure the upper panel mount 250 to the upper end of the panel member 242. The upper panel mount 250 also includes an L-shaped flange 256 which supports an inverted V-shaped top member 258 which is received within a mating V-shaped slot 82 formed in the underside of the top member 280, as described later. The inverted V-shaped top member 258 includes an inwardly projecting sloped flange 257, the purpose of which will be discussed later. The upper panel mount 250 also includes a C-shaped track 259, the purpose of which is discussed later.

Figure 41:
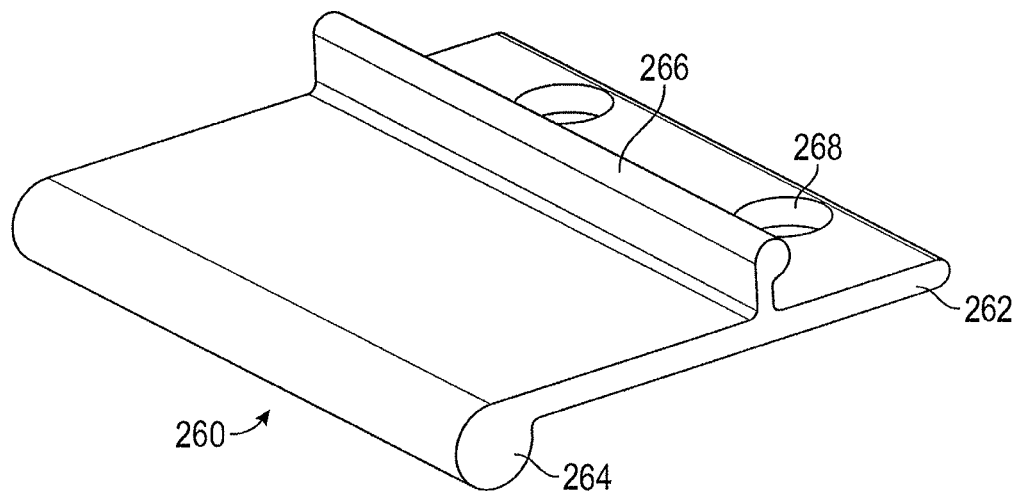
FIG. 41 is an enlarged perspective view of an embodiment of the lower panel mount of FIG. 38.
Figure 42:
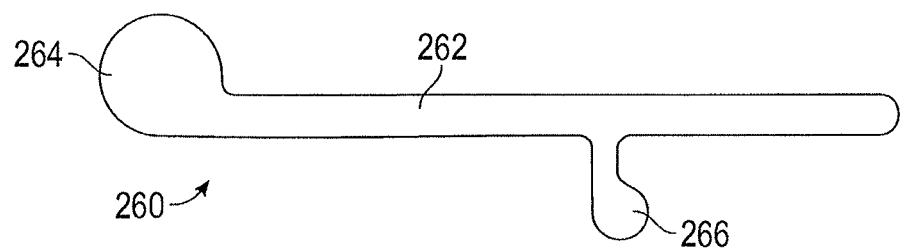
FIG. 42 is an end elevation view of the lower panel mount and top member mount of FIG. 41.
Figure 44:
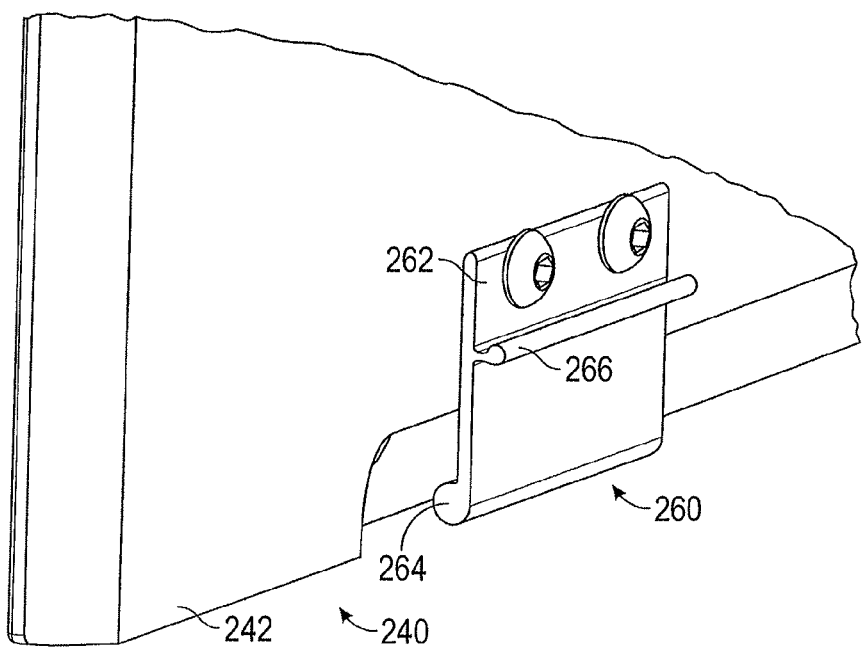
FIG. 44 is an enlarged partial perspective view of the lower portion of the wall panel of FIG. 38 showing the lower panel mount attached to the wall panel.

FIG. 41 is an enlarged perspective view of the lower panel mount 260, with an enlarged end view shown in FIG. 42. The lower panel mount 260 has substantially the same configuration as the lower panel mount 60 of the previous embodiment, but rather than providing one long lower panel mount as shown in FIGS. 6 and 9, in this embodiment, two short lower panel mounts 260 are spaced along the bottom end of the wall panel 242 as shown in FIG. 38. Each panel mount include a substantially flat mount body 262 with a bulbous end 264 and a bulbous projection 266, which cooperate with the base assembly 220 described later. Apertures 268 may be provided in the mount body 262 for receiving threaded connectors to secure the lower panel mount 260 to the lower end of the panel member 242 as shown in FIG. 44.

Figure 46:
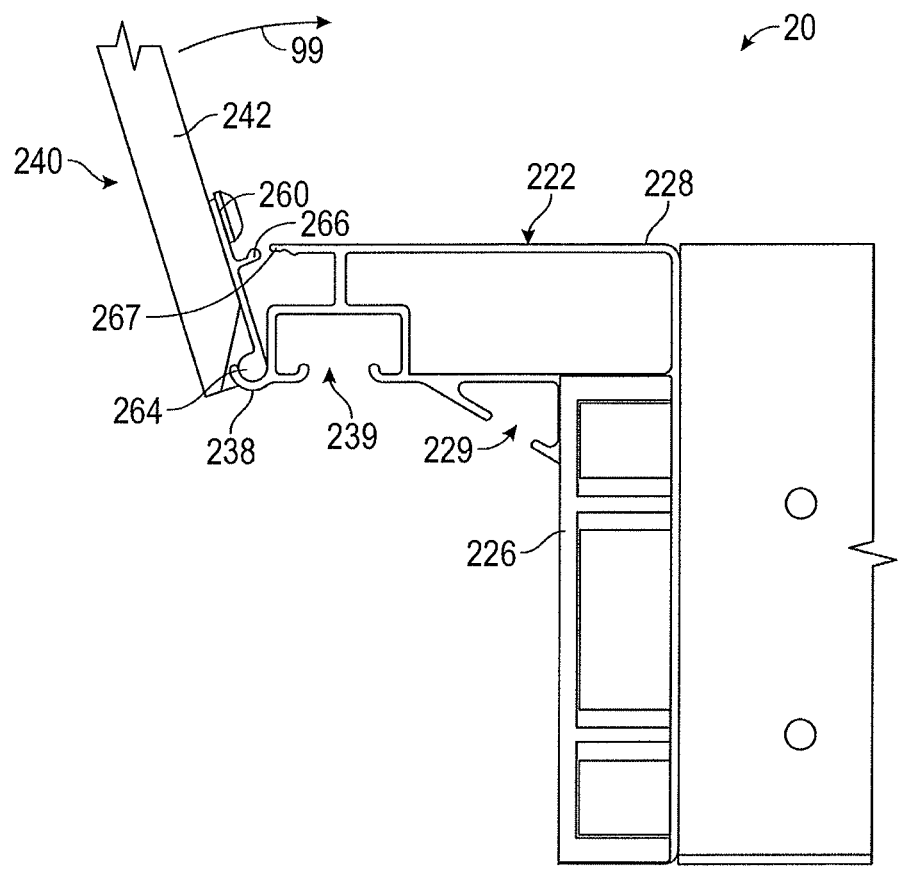
FIG. 46 is an enlarged elevation view showing the lower panel mount being positioned in the base assembly.
Figure 47:
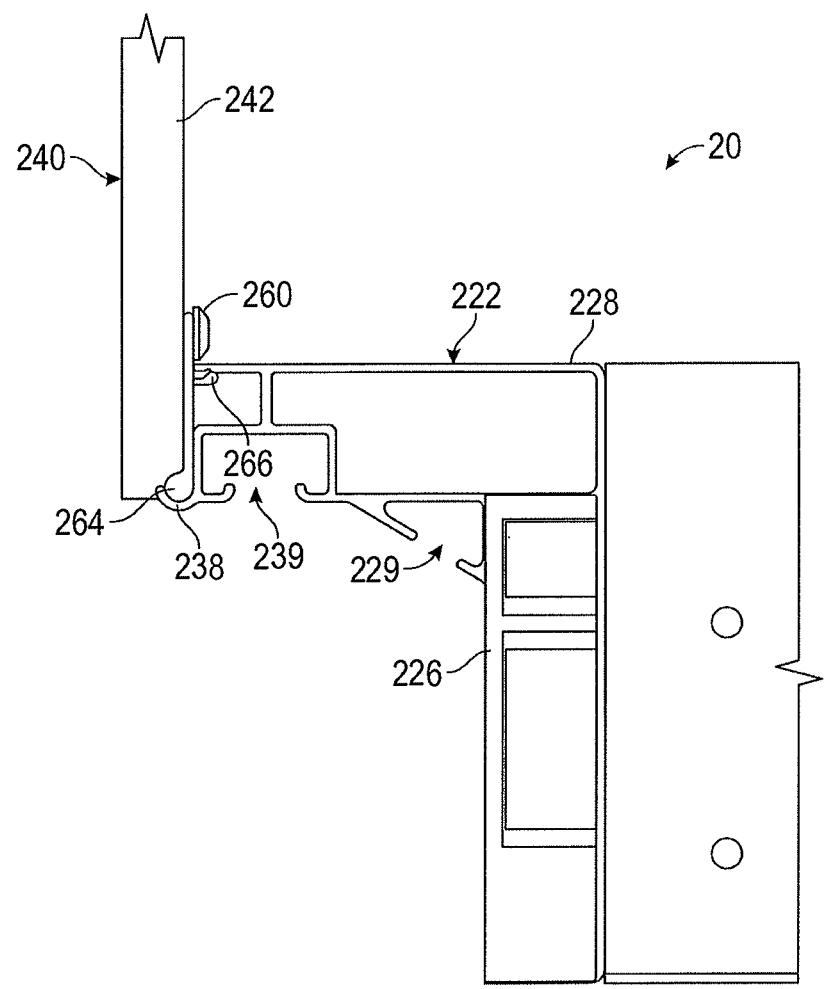
FIG. 47 is the same view as FIG. 46 showing the lower panel mount secured into the base assembly.
Figure 49A:
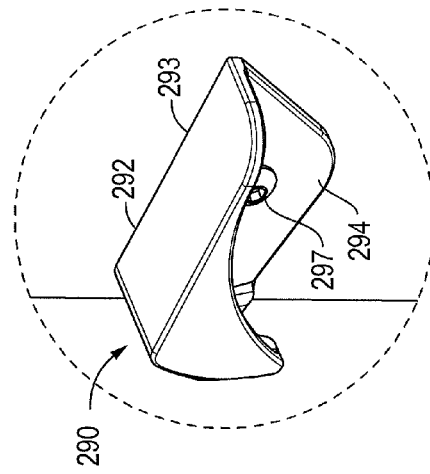
FIG. 49A is enlarged perspective views of the circled area of FIG. 48 showing another embodiment of a panel lock in the locked position.
Figure 49B:
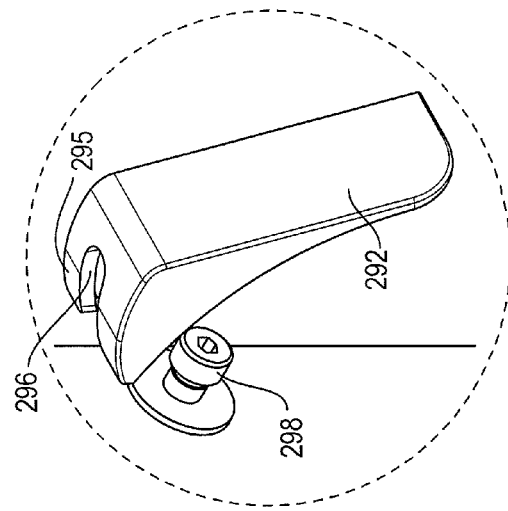
FIG. 49B is enlarged perspective view of the panel lock of FIG. 49A in the unlocked position.

FIGS. 45-51 illustrate the steps in assembling the modular table system 200. The base assembly 220 is pre-assembled as described above. The pre-assembled base assembly 220 is positioned on a floor or other surface. As best illustrated in FIGS. 45 and 46 a user then positions a first wall panel 240A over the base assembly 220 such that the bulbous end 264 of the lower panel mounts 260 are received within the upwardly curved flange 238 of a first base members 222A of the base assembly 220. The first wall panel 240A is then rotated inwardly as indicated by arrow 99 in FIG. 46 until the bulbous projection 266 is frictionally engaged with the outwardly projecting flange 236 of the base member 222 (FIG. 47). Referring to FIGS. 46 and 47, the end of the outwardly projecting flange 236 is configured to slidably receive the bulbous projection 266 as the wall panel 240 is rotated inwardly. A recess 267 may be provided in the underside of the outwardly projection flange 236 to receive the bulbous projection 266 to retain the first wall panel 240A in a substantially vertical position while the second wall panel 240B is being retrieved. The above process is repeated with a second wall panel 240B positioned in the base assembly 220 with respect to a second base member 222B adjacent to the first base member 222A.

Referring to FIGS. 45, 48 and 49A-49B, the two adjacent wall panels 240A, 240B are then locked together by a panel lock 210. The panel lock 290 comprises a lever 292 with a horizontal leg 293, a vertical leg 294 and capped end 295 with a slot 296. The vertical leg 294 of the lever 292 is pivotally secured to the inside of each wall panel 240 by a fastener 297. Near the opposite vertical edge of each wall panel 240 is a vertically aligned capped head fastener 298 which is received within the slot 296 as the lever 292 is pivoted down onto the aligned fastener 298 thereby locking the adjacent panels 240 together.

The above process is then repeated for the third wall panel 240C, and so on, until each of the wall panels 240 are positioned into the base assembly 220 and adjacent wall panels are locked together by the panel locks 290. It should be appreciated that with the panel locks 290 securing adjacent wall panels together and with lower panel mounts 260 engaged with the base assembly 220, a substantially laterally stable pedestal 212 is achieved onto which the top member 280 is received.

It should be appreciated that the vertical edges of the wall panels 240 may include a 45 degree miter such that when the adjacent wall panels are secured together by the panel locks 290, a 90 degree aesthetically pleasing corner is formed. Of course, if the pedestal 212 has a shape other than rectangular (e.g., triangular, trapezoidal, hexagonal, octagonal, etc.) the vertical edges may be mitered at an angle that corresponds to the angle of the corresponding shaped pedestal.

Referring to FIG. 48, once all of the wall panels are positioned in the base assembly and locked together, the top member 280 is ready to be attached to the assembled pedestal 212. The top member 280 may be any desired length and width or shape depending on the length, width and shape of the pedestal 212 to which it attaches. The top member 280 may be made of any suitable material. Like the wall panels 220, one type of material found to be particularly suitable is PVC wrapped MDF due to its relatively low cost and ability to resist scratching and chipping.

Figure 50:
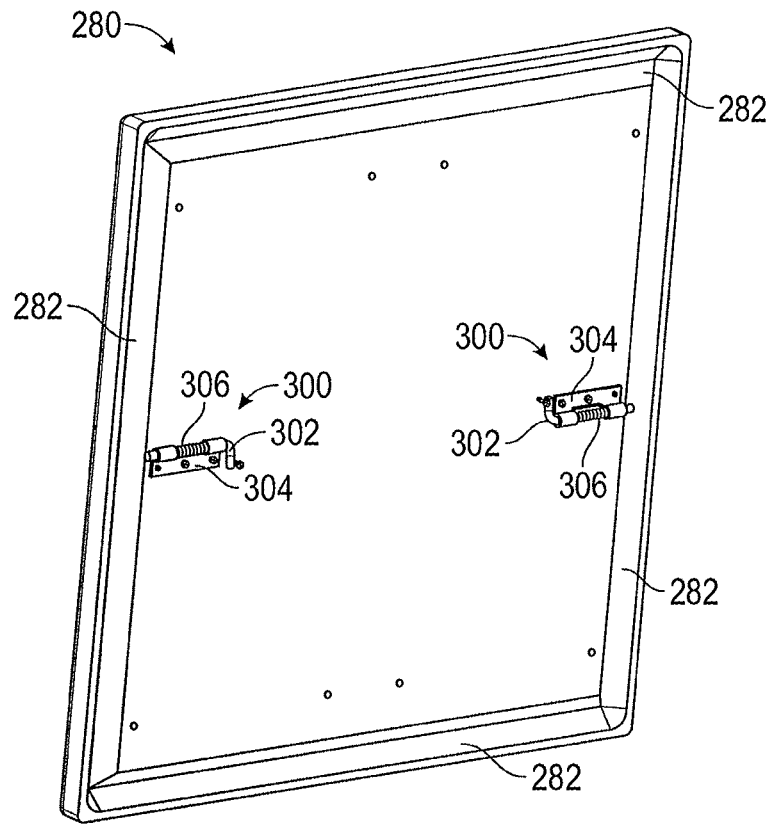
FIG. 50 is a perspective view of an inside surface of an embodiment of the top member.
Figure 51:
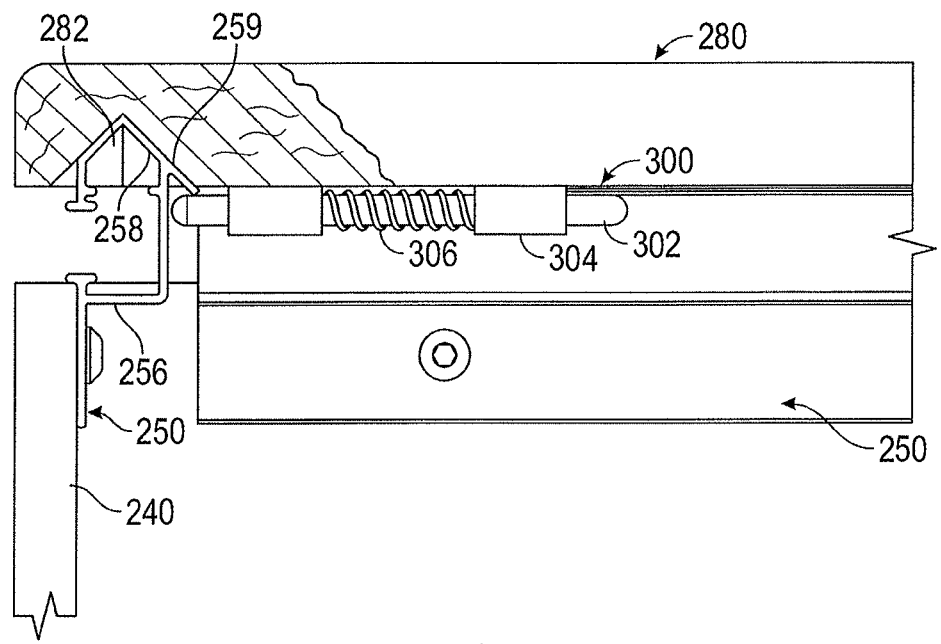
FIG. 51 is an enlarged elevation view with the top member in partial cross-section showing the top member secured within the upper panel mount of FIG. 38.

Referring to FIGS. 50 and 51, the bottom surface of the top member 280 includes a V-shaped groove 282 near its outer periphery for receiving the upper panel mount 250 as described below. Disposed on the underside of the top member is a top lock 300. As best viewed in FIG. 51, the top lock includes a pin 302 that is slidably received within a bracket 304. A spring 306 biases the pin laterally outwardly.

To securely attach the top member 280 to the pedestal 212 formed by the wall panels 240, the top member 280 is positioned horizontally over the upper panel mount 250 such that the inverted V-shaped top members 258 are received within the V-shaped grooves 282. The user then simply pushes vertically down on the top member 280 forcing the spring biased pin 302 inwardly as the outer end of the pin 302 engages with the sloped flange 257 of the inverted V-shaped top member 258. The spring biased pin 302 then springs outwardly when its end is pushed below the inwardly projecting sloped flange 257 of the inverted V-shaped top member 258, thereby locking the top member 280 onto the pedestal 212. It should be appreciated that the upper panel mount 250 is thereby substantially hidden from view providing a more finished and aesthetically pleasing furniture appearance when the modular table system 200 is assembled.

When it is desired to remove the top member 280 from the pedestal 212 in order to disassemble the modular table 200, the user simply reaches in through the open door panel 242-2 (FIG. 48) and pulls the pins 302 inwardly to disengage the end of the pin 302 from the sloped flange 257 of the inverted V-shaped top member 258 thereby allowing the top member 280 to be lifted off the upper panel mounts 250.

As previously described and illustrated in connection with FIG. 24, a bottom shelf panel not shown may be placed inside the pedestal 212 over the base assembly 220 and one or more intermediate shelf panels may be placed inside the pedestal 212 and supported on the wall panels 240 by pegs or other suitable shelf supports at a desired elevation within the pedestal 212.

It should be appreciated that the foregoing modular table system 10, 200 results in a rigid and laterally stable table that provides a durable, yet finished and aesthetically pleasing furniture appearance, while offering a secure storage area within the pedestal 12, 212. The modular table system 10, 200 may be assembled and disassembled without tools in minutes and may be easily packed into relatively small unit for transport, thereby making it ideal for use by exhibitors at trade shows.

As with the previous embodiment of the modular table system 10, the modular table system 200 may comprise any of the various shapes and sizes of rectangular and curved modular table systems as shown in FIGS. 25-26 and may be combined with the various accessories 100 including various length rectangular drop ledges 102 and various length rectangular "drop tops" 104 to produce a wide variety of shapes, sizes and configurations of modular tables systems for various uses as shown in FIGS. 27-30. Other accessories 100 such as shown in FIG. 28, may include monitors, iPads, tablets or other computer peripherals, lamps and other lighting fixtures, shelves, hang rails, fascia panels, standoff graphics, etc.

Figure 52:
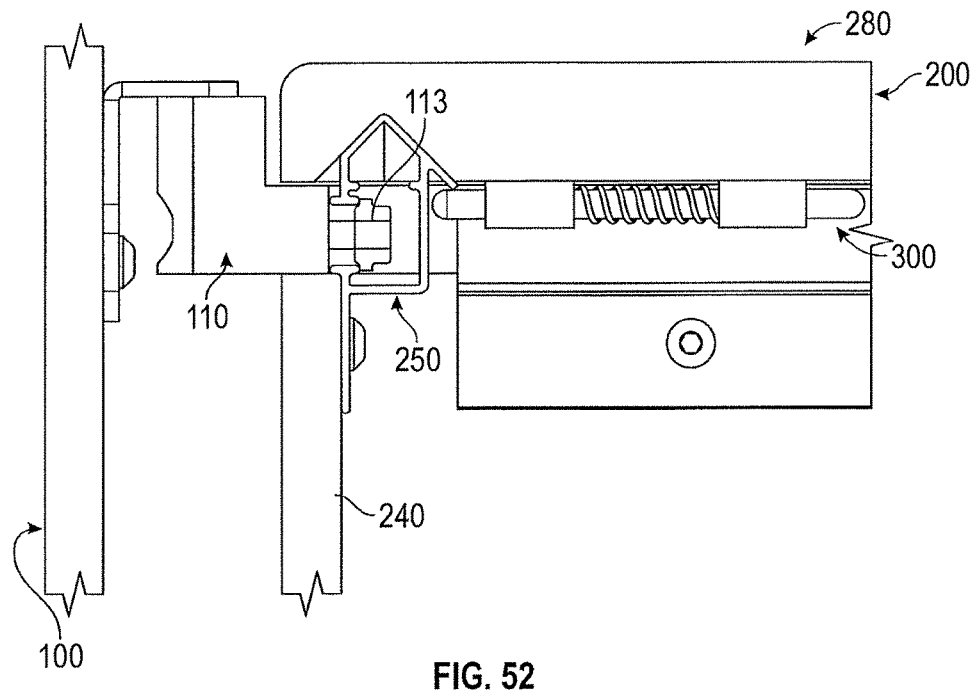
FIG. 52 illustrates another embodiment of an accessory mount for securing accessories to the modular table systems.
Figure 53:
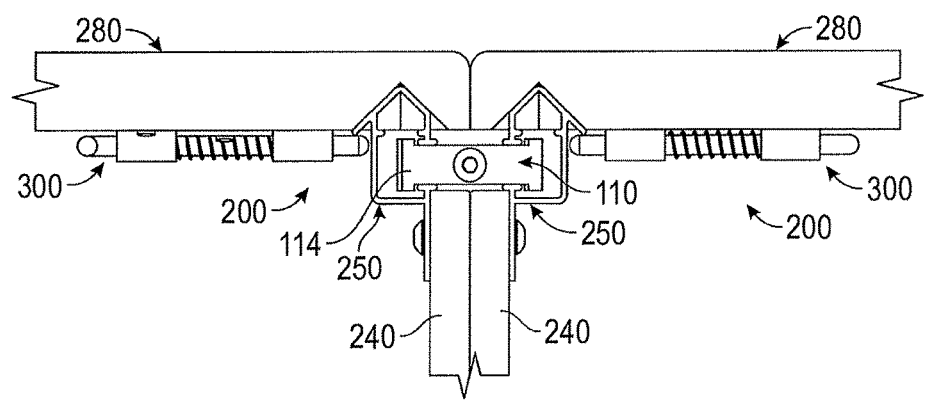
FIG. 53 illustrates another embodiment of a connector for securing two modular table systems together.

The accessories 100 may be attached to the modular table systems 200 by accessory mounts 110 as shown in FIGS. 52 and 53 which are slidably received into the C-shaped tracks 259 of the upper panel mounts 250. For example, as shown in FIG. 52, the accessory mount may be an L-shaped mechanical connector 113 having one end with a complimentary shape to the C-shaped track 259 such that it is slidable into the C-shaped track from one end, but which is laterally restrained by C-shaped track. Similarly, as shown in FIG. 53, the accessory mount may be an I-shaped mechanical connector 114 which is slidable into the C-shaped tracks 259 of two adjacent modular table systems, but which laterally joins the adjacent modular table systems. Various other configurations of accessory mounts 110 may also be provided which cooperate with the tracks 259 or other components of the modular table systems 200 for attaching accessories or joining table systems together.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A modular table system, comprising:
   a plurality of base members connected to one another to form a unitary base assembly having a predetermined number of sides, each of the plurality of base members having an upwardly curved extending flange and a substantially horizontal outwardly projecting flange;
   a plurality of wall panels each having an upper end, a lower end, a first vertical end, a second vertical end, an inside face and an outside face;
   a lower panel mount secured to the lower end of each of the plurality of wall panels, the lower panel mount having a downwardly extending end and an inwardly extending projection;
   wherein the lower panel mount of each of the plurality of wall panels is pivotally received by the upwardly extending flange of a corresponding one of the plurality of base members and with the inwardly extending projection of the lower panel mount of each of the plurality of wall panels frictionally engaging with the substantially horizontal outwardly projecting flange of the corresponding one of the plurality of base member, whereby each one of the plurality of wall panels is vertically and laterally restrained by the corresponding one of the plurality of base members such that the plurality of wall panels together form a pedestal above the unitary base assembly with the pedestal having a number of sides corresponding to the predetermine number of sides of the unitary base assembly;
   a top member having a top surface and a bottom surface and an outer periphery, the bottom surface having a groove formed therein corresponding to the number of sides of the pedestal, the groove vertically receiving an upper panel mount secured to the upper end of at least some of the plurality of wall panels.

2. The modular table system of claim 1, wherein the upwardly extending flange of each of the plurality of base members is an upwardly curved flange, and wherein the downwardly extending end of the lower panel mount comprises a bulbous end, such that the bulbous end of the lower panel mount pivots within the curved flange.

3. The modular table system of claim 1 wherein the top member is PVC wrapped MDF.

4. The modular table system of claim 1 wherein each of the plurality of wall panels are PVC wrapped MDF.

5. The modular table system of claim 1 wherein each of the plurality of base members comprises a channel.

6. The modular table system of claim 5 wherein LED lighting is received in the channel.

7. The modular table system of claim 1 wherein the upper panel mount comprises a channel.

8. The modular table system of claim 7, further comprising:
   an accessory having an accessory mount received within and supported by the channel of the upper panel mount.

9. The modular table system of claim 8 wherein the accessory is selected from the group consisting of drop ledges, drop tops, monitors, computers, computer peripherals, lighting fixtures, shelves, hang rails, fascia panels, standoff graphics and a second modular table system.

10. The modular table system of claim 1, wherein the first vertical end of each of the plurality of wall panels abuts the second end of an adjacent one of the plurality of wall panels.

11. The modular table system of claim 10, wherein the first vertical end of each of the plurality of wall panels includes a panel lock movable between a locked position and an unlocked position, wherein, in the locked position, the first vertical end of each of the plurality of walls panels is rigidly secured to the second vertical end of the adjacent one of the plurality of wall panels, and in the unlocked position, the first vertical end of each of the plurality of wall panels is separable from the second vertical end of the adjacent one of the plurality of wall panels.

12. The modular table system of claim 11, further comprising:
   a top lock having a locked position and an unlocked position, wherein, in the locked position, the top member is rigidly secured to the pedestal, and in the unlocked position, the top member is separable from the pedestal.

13. The modular table system of claim 12, wherein, with the top lock in the locked position and with the panel lock of each of the plurality of wall panels in the locked position, the pedestal together with the top member define a securely enclosed interior volume.

14. The modular table system of claim 10, wherein the first vertical end of each of the plurality of wall panels and the second vertical end of the adjacent one of the plurality of wall panels are mitered to form a corner.

15. The modular table system of claim 1, wherein at least one of the wall panels includes a hinged door.

16. The modular table system of claim 1, wherein the predetermined number of sides include three, four, five, six, seven or eight sides.

* * * * *